(12) United States Patent
Fu

(10) Patent No.: US 12,256,277 B2
(45) Date of Patent: Mar. 18, 2025

(54) MEASUREMENT METHOD AND DEVICE

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 357 days.

(21) Appl. No.: 17/941,618

(22) Filed: Sep. 9, 2022

(65) Prior Publication Data

US 2023/0007523 A1   Jan. 5, 2023

Related U.S. Application Data

(63) Continuation of application No. PCT/CN2020/078667, filed on Mar. 10, 2020.

(51) Int. Cl.
| | |
|---|---|
| *H04W 24/10* | (2009.01) |
| *H04B 7/185* | (2006.01) |
| *H04W 36/00* | (2009.01) |
| *H04W 56/00* | (2009.01) |
| *H04W 84/04* | (2009.01) |

(52) U.S. Cl.
CPC .... *H04W 36/0088* (2013.01); *H04B 7/18504* (2013.01); *H04B 7/18519* (2013.01); *H04W 24/10* (2013.01); *H04W 56/0055* (2013.01); *H04W 84/042* (2013.01)

(58) Field of Classification Search
CPC ............ H04W 24/10; H04W 56/0055; H04B 7/18519; H04B 7/18504

USPC ......................................................... 370/252
See application file for complete search history.

(56) References Cited

U.S. PATENT DOCUMENTS

| | | | |
|---|---|---|---|
| 2022/0279394 A1* | 9/2022 | Gao | H04W 48/20 |
| 2022/0279404 A1* | 9/2022 | Wakabayashi | H04W 56/0045 |

FOREIGN PATENT DOCUMENTS

| | | |
|---|---|---|
| CN | 105794276 A | 7/2016 |
| CN | 109218344 A | 1/2019 |
| CN | 109327868 A | 2/2019 |
| CN | 110741671 A | 1/2020 |
| EP | 3331258 A1 | 6/2018 |
| EP | 4054235 A1 | 9/2022 |
| EP | 4054246 A1 | 9/2022 |

(Continued)

OTHER PUBLICATIONS

Sony Discussion on physical layer control procedures 3GPP TSG RAN WG1 #97 R1-1906829 May 13, 2019 (4 pages).

(Continued)

*Primary Examiner* — Faisal Choudhury
(74) *Attorney, Agent, or Firm* — Young Basile Hanlon & MacFarlane, P.C.

(57) ABSTRACT

Provided are a measurement method and apparatus, and devices. The method comprises: a terminal device acquiring a plurality of measurement parameters of a network device; and the terminal device determining a first measurement parameter from the plurality of measurement parameters, and performing measurement on a TN cell according to the first measurement parameter. The communication performance between the terminal device and the network device is improved.

18 Claims, 5 Drawing Sheets

(56) References Cited

FOREIGN PATENT DOCUMENTS

WO      2020029302 A1     2/2020
WO      2021037645 A1     3/2021

OTHER PUBLICATIONS

International search report and Written Opinion with English Translation of the International Search Authority PCT/CN2021/078667 mailed Dec. 12, 2020 (14 pages).
Huawei, HISilicon Service continuity between TN and NTN 3GPP TSG-RAN WG2 Meeting; 108; Reno, USA, Nov. 18-22, 2019; R2-1915192.
Huawei, HiSilicon Service continuity and feeder link switch in NTN 3GPP TSG-RAN WG2 Meeting; 107bis; Chongqing, China; Oct. 14-18, 2019; R2-1913174.
European Examination Report, European Application No. 20923953.2, mailed Mar. 9, 2023 (14 pages).

\* cited by examiner

Periodic SMTC parameter

Non-periodic SMTC parameter

Periodic measurement gap parameter

Non-periodic measurement gap parameter

MEASUREMENT METHOD AND DEVICE

CROSS-REFERENCE TO RELATED APPLICATION(S)

The present application is a continuation-application of International (PCT) Patent Application No. PCT/CN2020/078667, filed on Mar. 10, 2020, the entire contents of which are hereby incorporated by reference.

TECHNICAL FIELD

The present disclosure relates to the field of communication, and in particular to measurement method, an apparatus, and a device.

BACKGROUND

A non-terrestrial network (NTN) is a communication network between a terminal device and a satellite (which may also be named as a network device).

When the terminal device is located in a NTN cell, the terminal device may perform cell measurement based on measurement configuration information. When the terminal device finds a terrestrial network (TN) cell based on the cell measurement, the terminal device may access the TN cell. When a time interval between two measurements indicated by the measurement configuration information is excessively long, the terminal device may not discover the TN cell in time. When a time interval between two measurements indicated by the measurement configuration information is excessively short, the terminal device may perform the cell measurement frequently, resulting in low transmission performance. Therefore, the measurement method as shown above may cause poor communication performance between the terminal device and the network device.

SUMMARY

According to a first aspect, the present disclosure provides a measurement method including: obtaining, by a terminal device, a plurality of measurement parameters of a network device; and determining, by the terminal device, a first measurement parameter from the plurality of measurement parameters and performing measurement on a terrestrial network (TN) cell based on the first measurement parameter.

According to a second aspect, the present disclosure provides a measurement method including: determining, by a network device, a plurality of measurement parameters; sending, by the network device, the plurality of measurement parameters to a terminal device, wherein a first measurement parameter of the plurality of measurement parameters is used by the terminal device to perform measurement on a terrestrial network (TN) cell.

According to a third aspect, the present disclosure provides a terminal device, including a transceiver, a processor, and a memory.

The memory is configured to store computer-executable instructions.

The processor is configured to execute the computer-executable instructions stored in the memory to enable the processor to perform the method of the first aspect.

DETAILED DESCRIPTION

Figure 1:
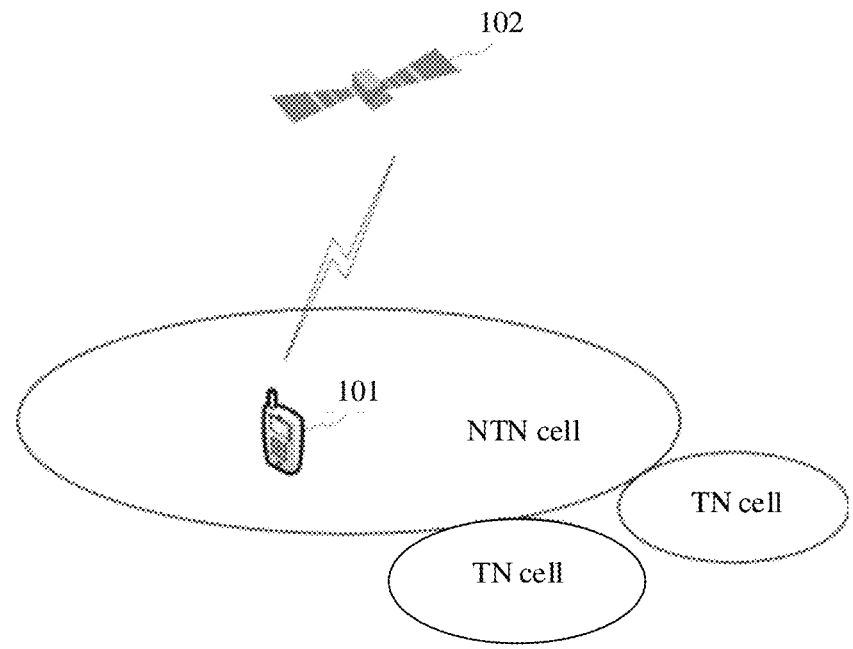
FIG. 1 is a schematic view of an architecture of a communication system according to an embodiment of the present disclosure.

To facilitate understanding, concepts involved in the present disclosure will be explained firstly.

A terminal device may usually have wireless transceiver function. The terminal device may be configured on the ground, including the indoor ground or the outdoor ground, or may be handheld, wearable or vehicle-mounted. The terminal device may also be configured on water (such as a ship and so on). The terminal device may also be configured in the air (such as on an aircraft, on a balloon, on a satellite, and so on). The terminal device may be a mobile phone, a tablet computer (Pad), a computer having the wireless transceiver function, a virtual reality (VR) terminal device, an augmented reality (AR) terminal device, a wireless terminal in industrial control, a vehicle-mounted terminal, a wireless terminal for self-driving, a wireless terminal device for remote medical, a wireless terminal device in a smart grid, a wireless terminal device for transportation safety, a wireless terminal device in a smart city, a wireless terminal device in a smart home, a wearable terminal device, and so on. The terminal device mentioned in embodiments of the present disclosure may further be referred to as a terminal, user equipment (UE), an access terminal device, a vehicle-mounted terminal, an industrial control terminal, a UE unit, a UE station, a mobile station, a mobile platform, a remote station, a remote terminal device, a mobile device, a UE terminal, a wireless communication device, a UE agent, a UE apparatus, and so on. The terminal device may be fixed or mobile.

A network device may usually have wireless transceiver function. The network device may be mobile. For example, the network device may be a mobile device. In some embodiments, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, and so on. For example, an altitude range of an orbit of the LEO satellite may usually be 500 km-1500 km, and an orbital period (a period that the satellite rotates around the Earth) may be about 1.5 hours-2 hours. Signal transmission delay of single-hop communication between users may be about 20 ms. The delay of single-hop communication between users may refer to delay of transmission from the terminal device to the network device. A maximum satellite visible time may be about 20 minutes. The maximum visible time may be a longest time period that beams of the satellite covers a certain area of the ground. The LEO satellite may be movable relative to the ground. As the satellite moves, a ground area covered by the satellite may change. A signal propagation distance of the LEO satellite may be short, and a link loss may be low, and therefore, a transmitting power of the terminal device may not be required to be high. The altitude of the orbit of the GEO satellite may be usually 35786 km, and an orbital period may be 24 hours. The delay of signal transmission of single-hop communication between users may be 250 ms. In order to ensure coverage of the satellite and improve system capacity of the communication network, the satellite may use multiple beams to cover the ground. For example, one satellite may form dozens or hundreds of beams to cover the ground, and one of the dozens or hundreds of beams may cover a ground area of tens to hundreds of kilometers in diameter. Of course, the network device may also be a base station installed on land, on water, and so on. For example, the network device may be a next generation base station (gNB) or a next generation-evolved NodeB (ng-eNB). The gNB provides a user-plane function and a control-plane function of new radio (NR) for the UE. To be noted that, the gNB and the ng-eNB may only be a name to indicate a base station supporting the 5G network system, and do not have a limited meaning. The network device may also be a base transceiver station (BTS) in a GSM system or a CDMA system, or a base station in a WCDMA system (NB), or an evolutional node B (eNB or eNodeB) in an LTE system. Alternatively, the network device may be a relay station, an access point, a vehicle-mounted device, a wearable device, and a network device in a PLMN network after the 5G, a road site unit (RSU), and so on.

Continuity of a TN service and a NTN service: In order to ensure that continuous services can be provided to a terminal device, the TN service and the NTN service usually need to be continuous. The NT service may refer to a service under NT, and the NTN service may refer to a service under NTN. Continuity of the NTN service may be ensured by the following ways.

In a first way, when the terminal device is served by a NTN cell (that is, the NTN cell provides the NTN service for the terminal device), TN measurement for the TN cell may be de-activated. That is, while the TNT cell is providing the NTN service to the terminal device, the terminal device may not perform measurement on the TN cell to prevent the NTN service from being interrupted. The terminal device performing measurement on the cell may indicate measurement of a signal of the cell or measurement of a beam corresponding to the cell, and so on. The measurement of the cell may obtain at least one of following information: a reference signal received power (RSRP), a reference signal receiving quality (RSRQ), a signal to interference plus noise ratio (SINR), a received signal strength indication (RSSI), and so on.

In a second way, when the terminal device tries to detect potential TN coverage (even when served by the NTN cell), a long periodic (less frequent measurements) configuration (provided by a serving RAN) may be configured for the terminal device. In other words, when the terminal device tries to measure the TN cell, the measurement of the TN cell may be performed across a relatively long period, such that measurements of the TN cell may be performed less frequently.

Mobility of the NT service and the NTN service: Since the terminal device and the network device may be mobile, the NT service and the NTN service may be mobile. The terminal device may switch from one network to another. For example, the terminal device may switch from the NTN to the NT. Alternatively, priority of the NT may be higher than that of the NTN. That is, the terminal device may access the NT with priority. When the terminal device is located in the NTN cell, the terminal device may measure the TN cell to switch to the TN cell. In the following, a way of the terminal device in the NR performing measurement on a cell may be explained.

For a terminal device in an unconnected state in the NR:

In the NR, a protocol state of radio resource control (RRC) may include: a RRC idle state, a RRC inactive state and a RRC connected state.

When the terminal device is in the RRC idle state, service mobility may be achieved through cell reselection of the terminal device. A core network (CN) may initiate paging and configure a paging area. A UE access stratum (AS) context may be absent in the network device. The RRC connection between the terminal device and the network device may not be present.

When the terminal device is in the RRC inactive state, service mobility may be achieved through cell reselection of the terminal device. Connection between the CN and the NR may be present. The UE AS context may be present in the network device. A RAN may initiate paging and configure the paging area. The network device may determine a location of the terminal device based on a level of the paging area configured by the RAN.

When the terminal device is in the RRC connected state, the network device may control mobility of the service. RRC connection may be present between the network device and the terminal device, and data may be transferred between the network device and the terminal device. The UE AS context may be present in each of the network device and the terminal device. The location of the terminal device obtained by the network device may be at a cell level.

When the terminal device is in the RRC idle state or in the RRC inactive state, in order to support the mobility of the terminal device, the terminal device may perform signal measurement on a current cell and/or a cell adjacent to the current cell to achieve cell selection or reselection. The network device may inform the terminal device of configuration information for cell selection or reselection by broadcasting. For example, the configuration information may include a measurement frequency point, a list of neighboring cells corresponding to each measurement frequency point, and so on.

The network device may configure a synchronous block measurement timing configuration (SMTC) parameter for each measurement frequency point. The SMTC parameter may be configured to indicate a time point when the terminal device receives the synchronous signal block (SSB). The terminal device may receive the SSB based on the SMTC and measure signal quality of the current cell and/or the cell adjacent to the current cell based on the received SSB to perform cell selection or reselection.

For a Terminal Device in the NR Connected State:

When the terminal device is in the NR connected state, the network device may send measurement configuration information to the terminal device. The terminal device may perform cell measurement based on the measurement configuration information and perform cell selection or reselection based on cell measurement results. For example, the network device may send the measurement configuration information to the terminal device via an RRC message. In some embodiments, the measurement configuration information may include at least one of: a measurement object, reporting configuration, a measurement identity, a measurement gap.

Measurement Object: For intra-frequency measurement and inter-frequency measurement, each measurement object may indicate a time-frequency location to be measured and a sub-carrier interval of a reference signal. For the inter-frequency measurement, each measurement object may correspond to one independent E-UTRA frequency point. The network device may configure a cell associated with the measurement object. For example, the network device may configure one or more of: a cell offset list, a cell black list, and a cell white list. The terminal device may perform event evaluation and measurement on any cell in the white list, but may not perform the event evaluation and the measurement on any cell in the black list.

Reporting Configuration: Each measurement object may correspond to one or more reporting configurations. The reporting configuration may include at least one of: a reporting criterion, an RS type, and a reporting format. The reporting criterion may be a trigger condition for the terminal device to perform measurement reporting. The reporting may be triggered periodically or may be triggered by a measurement event. The RS type may be a type of an RS used by the terminal device to perform beam and cell measurement. The RS type may be SS/PBCH block or CSI-RS. The reporting format may be the amount of reported measurements performed by the terminal device for each cell and each beam (such as a reference signal receiving power (RSRP)). The reporting format may include other relevant information, such as the maximum number of cells reported by the terminal device and the maximum number of beams reported by the terminal device for each cell. The measurement event supported in the NR can include: an A1 event, an A2 event, an A3 event, an A4 event, an A5 event, an A6 event, a B1 event, and a B2 event. The A1 event may be that signal quality of a serving cell is higher than a threshold. The A2 event may be that signal quality of a serving cell is lower than a threshold. The A3 event may be that signal quality of a neighboring cell is higher than a threshold compared to signal quality of a SpCell (primary and primary-secondary cell). The A4 event may be that the signal quality of the neighboring cell is higher than a threshold. The A5 event may be that the signal quality of the SpCell is lower than a threshold 1. The A6 event may be that the signal quality of the neighboring cell is higher than a threshold compared to the signal quality of the PCell (primary cell). The B1 event may be that the signal quality of the neighboring cell of the inter-frequency measurement is higher than a threshold. The B2 event may be that the signal quality of the PCell (primary cell) is lower than the threshold 1, and the signal quality of the neighboring cell of the inter-frequency measurement is higher than a threshold 2.

Measurement Identity: The measurement identifier may associate the measurement object with the reporting configuration. One measurement object may be associated with a plurality of reporting configurations at the same time. One reporting configuration may be associated with a plurality of measurement objects at the same time. The above associations may be distinguished based on the measurement identifier. The measurement identifier may be an independent ID.

Measurement Gap: The measurement gap may be configured to indicate a time point when the terminal device performs inter-frequency measurement or inter-system measurement. The terminal device may perform inter-frequency measurement or inter-system measurement during the measurement gap. Measurement gap configuration may include a period of the measurement gap (mgrp), a starting time of the measurement gap within one period (also known as a starting time gap offset), a time length of the measurement gap (mgl), and so on.

Measurement Reporting: Measurement reporting may refer to the terminal device sending a measurement report to the network device. After the terminal device performs measurement on the cell, when certain trigger conditions are met, the terminal device may perform evaluation of measurement reporting. When the conditions for reporting are met, the terminal device may send a measurement report to the network device. The measurement report may include following three categories: event-triggered reporting, periodic reporting and event-triggered periodic reporting.

Event-triggered reporting means that sending the measurement report may be triggered only when the terminal device meets a measurement event entry threshold configured by the network device and lasts for a period of time. A reporting process may be terminated after the measurement report is sent for once. The reporting configuration corresponding to the criterion may include the following. A trigger type may be "event" and include one of the measurement events A1-A6 and B1-B2 and the threshold parameter corresponding to each of the included event. The number of reporting may be 1. The reporting gap may be ignored by the terminal device regardless of a value of the reporting gap.

Periodic reporting means that the terminal device may perform measurements on corresponding frequency points based on configured content of the network device, and may send the measurement report based on a prescribed reporting period and gap. The reporting period of the terminal device may be a period configured by the network device. Objectives of reporting by the terminal device may include: "reportCGI (reporting a cell global identifier)" and "reportStrongestCell (reporting the strongest cell)".

When the objective of reporting is "reportCGI", the number of reporting may be equal to 1. When the objective of reporting is "reportStrongestCell", the number of reporting may be greater than 1. When the objective of reporting performed by the terminal device is"reportCGI", the terminal device may turn on a T321 timer after reporting. In order to enable the network device to obtain information required to form a neighboring cell list as soon as possible, the terminal device may stop the T321 timer and initiate reporting in advance in response to content required for reporting being obtained before the timer being timeout.

Event-triggered periodic reporting means that sending the measurement report may be triggered only when the terminal device meets the measurement event entry threshold configured by the network device and lasts for a period of time. After reporting is triggered, the terminal device may turn on a timer between a plurality of measurements and a counter for counting the number of measurements until the process is terminated in response to the number of reporting reaching a requirement. The reporting configuration corresponding to the criterion may include the following. The trigger type may be "event" and include one of the measurement events A1-A5 and the threshold parameter corresponding to the included event. The number of reporting may be greater than 1. The reporting gap may be valid, and the network may set a reporting period timer based on the configured gap parameter.

Figure 2:
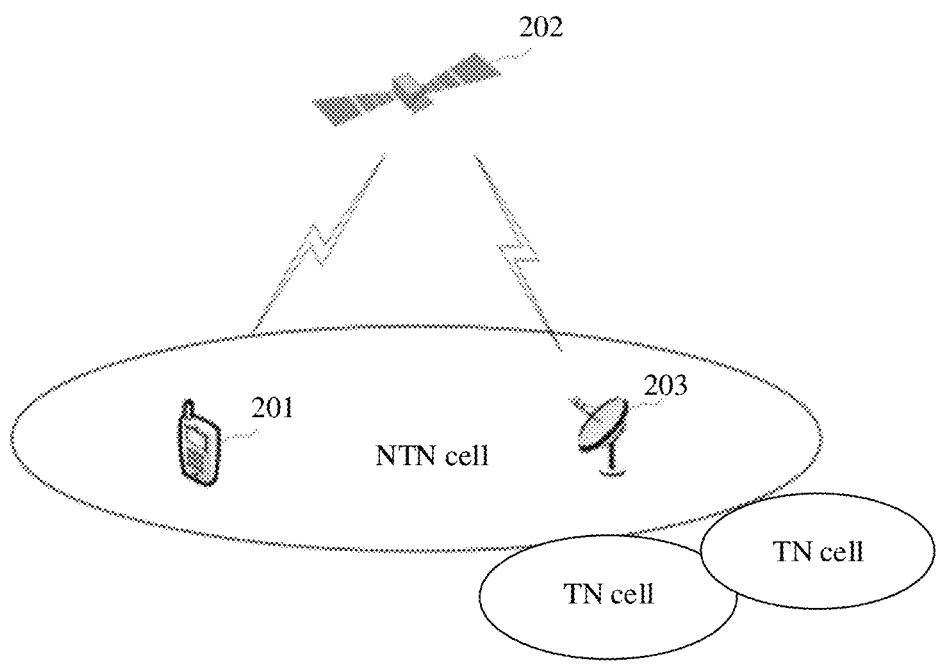
FIG. 2 is a schematic view of an architecture of another communication system according to an embodiment of the present disclosure.

In the following, as shown in FIG. 1 and FIG. 2, architecture of a communication system in the present disclosure will be described.

FIG. 1 is a schematic view of an architecture of a communication system according to an embodiment of the present disclosure. As shown in FIG. 1, the communication system may include a terminal device 101 and a satellite 102. Wireless communication may be performed between the terminal device 101 and satellite 102. A network formed between the terminal device 101 and the satellite 102 may be referred to as an NTN. In the architecture of the communication system shown in FIG. 1, the satellite 102 may function as a base station, and direct communication may be performed between the terminal device 101 and the satellite 102. The cell served by the satellite 102 may be referred to as an NTN cell, and a neighboring cell of the NTN cell may include a TN cell (such as a cell served by the base station). In the system architecture, the satellite 102 may be referred to as a network device.

FIG. 2 is a schematic view of an architecture of another communication system according to an embodiment of the present disclosure. As shown in FIG. 2, the communication system may include a terminal device 201, a satellite 202, and a base station 203. Wireless communication may be performed between the terminal device 201 and the satellite 202. Communication may be performed between the satellite 202 and the base station 203. A network formed between terminal device 201, the satellite 202, and the base station 203 may be referred to as the NTN. A cell served by the satellite 202 may be referred to as the NTN cell, and a neighboring cell of the NTN cell may include a TN cell (such as a cell served by the base station). In the architecture of the communication system shown in FIG. 2, the satellite 202 does not function as the base station, and communication between the terminal device 101 and the base station 203 requires relaying through the satellite 202. In the present system architecture, the base station 103 may be referred to as the network device. Alternatively, the TN cell may be included in a NTN range.

To be noted that, FIGS. 1-2 illustrate the system architecture applied to the present disclosure by showing examples, and shall not limit the system architecture of the present disclosure.

When the terminal device is located in the NTN cell, the terminal device may measure a TN cell in the neighboring cell. In the present embodiment, the network device may configure a plurality of measurement parameters for the terminal device, such that the terminal device may select a first measurement parameter from the plurality of measurement parameters based on actual situations (such as based on a distance between the terminal device and the network device, timing advance (TA), round trip transmission time (RTT), and so on). Further, the terminal device may measure the TN cell based on the first measurement parameter. In this way, a situation that the terminal device is unable to discover the TN cell in time or performs measurements frequently, may be prevented, and communication performance between the terminal device and the network device may be improved.

In the following, technical solutions of the present disclosure will be described in detail through specific embodiments. To be noted that each embodiment may be implemented alone, or various embodiments may be implemented in combination with each other. The same or similar elements will not be repeated in the various embodiments.

Figure 3:
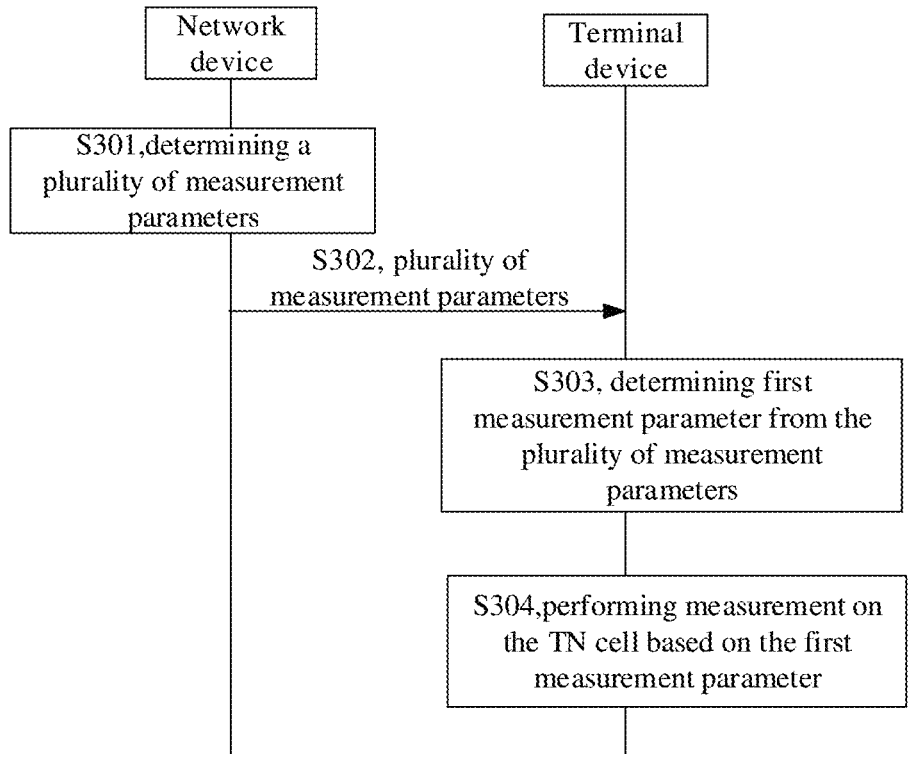
FIG. 3 is a flow chart of a measurement method according to an embodiment of the present disclosure.

FIG. 3 is a flow chart of a measurement method according to an embodiment of the present disclosure. As shown in FIG. 3, the method may include following operations.

In an operation S301, the network device may determine a plurality of measurement parameters.

The plurality of measurement parameters may include at least two SMTC parameters and/or at least two measurement gap parameters.

Each of the SMTC parameters may be configured to indicate a time point when the terminal device receives the SSB. The SMTC parameter may be periodic or non-periodic. When the SMTC parameter is periodic, the SMTC parameter may include at least one of: a period of the SMTC, a time length of the SMTC, a starting time of the SMTC in one period, and an ending time of the SMTC in one period. The period of the SMTC may be a period configured for the terminal device to detect/receive the SSB. The time length of the SMTC may be time length configured for the terminal device to detect/receive the SSB. From the starting time, the terminal device starts detecting/receiving the SSB. Time length of detecting/receiving the SSB may be the time length of the SMTC. At the ending time, the terminal device detecting/receiving the SSB may be terminated.

Figure 4A:
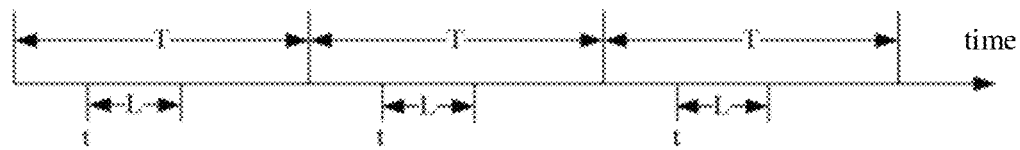
FIG. 4A is a schematic view of a periodic SMTC parameter according to an embodiment of the present disclosure.

In the following, as shown in FIG. 4A, the periodic SMTC parameter will be illustrated.

FIG. 4A is a schematic view of a periodic SMTC parameter according to an embodiment of the present disclosure. As shown in FIG. 4A, the period of the SMTC included in the SMTC parameter may be T. The starting time in one period may be t. The time length of the SMTC may be L. For example, the period of the SMTC may be 4 ms, the starting time in one period can be 1 ms, and the time length of the SMTC may be 1.5 ms. In this way, the terminal device may receive the SSB every 4 ms, and start receiving the SSB at the 1 ms of each period, and the time length of receiving the SSB may be 1.5 ms.

To be noted that, FIG. 4A illustrates the periodic SMTC parameter by illustrating an example only, and does not limit the periodic SMTC parameter.

When the SMTC parameter is non-periodic, the SMTC parameter may include a plurality of time lengths of the SMTC, a starting time within each of the plurality of time lengths, and a time length of the SMTC within each of the plurality of time lengths. Within each time length, the terminal device may receive the SSB once. The time length of the SMTC may be a length of time that the terminal device receives the SSB. In detail, the time length may be represented in a form of a bitmap.

Figure 4B:
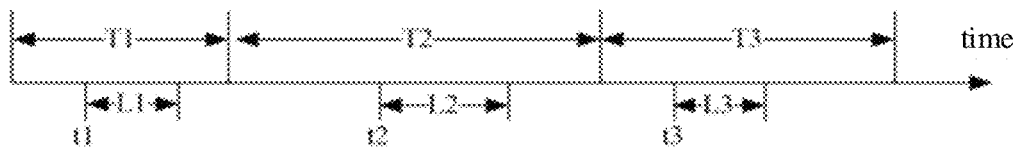
FIG. 4B is a schematic view of a non-periodic SMTC parameter according to an embodiment of the present disclosure.

In the following, as shown in FIG. 4B, the non-periodic SMTC parameter will be illustrated.

FIG. 4B is a schematic view of a non-periodic SMTC parameter according to an embodiment of the present disclosure. As shown in FIG. 4B, the SMTC parameter may include three SMTC time lengths (T1, T2, and T3, respectively). A starting time in the time length T1 may be t1, a starting time in the time length T2 may be t2, and a starting time in the time length T3 may be t3. The time length of the SMTC in the time length T1 may be L1, the time length of the SMTC in the time length T2 may be L2, and the time length of the SMTC in the time length T3 may be L3. Some of the above T1, T2 and T3 may different, or T1, T2 and T3 are all different from each other. Some of the above t1, t2 and t3 may different, or t1, t2 and t3 are all different from each other. Some of the above L1, L2 and L3 may different, or L1, L2 and L3 are all different from each other. For example, the T1 may be 3 ms, t1 may be 1 ms, and L1 may be 1 ms. The terminal device may start receiving SSB at the $1^{st}$ ms of the time length T1, and the time length of receiving the SSB may be 1 ms. The T2 may be 6 ms, t2 may be 2 ms, and L1 may be 2 ms. The terminal device may start receiving the SSB at the $2^{nd}$ ms of the time length T2, and the time length of receiving the SSB may be 2 ms.

In some embodiments, it may be indicated whether each time unit may be configured for SSB detection. The time unit may be a symbol (symbol), a time slot (slot), a millisecond (ms), and so on. For example, the time unit may be 1 ms. Within 10 ms, locations of 0 ms, 1 ms, and 2 ms being indicated as a first value, such as 1, may indicate that the SSB detection may be performed at 0 ms, 1 ms and 2 ms. Within the 10 ms, locations of other time points (ms) being indicated a second value, such as 0, may indicate that the SSB detection may not be performed at the other time points (ms).

To be noted that, FIG. 4B illustrates the non-periodic SMTC parameter by illustrating an example only, and does not limit the non-periodic SMTC parameter.

The measurement gap parameter may be configured to indicate time when measurement of the TN cell is performed. The measurement gap parameter may be periodic or non-periodic.

When the measurement gap parameter is periodic, the measurement gap parameter may include at least one of: a period of the measurement gap, a time length of the measurement gap, a starting time of the measurement gap within one period, and an ending time of the measurement gap within one period. The period of the measurement gap may be a period of the gap configured between measurements. Alternatively, the period of the measurement gap may refer to a period that the terminal device performs cell measurement. The terminal device may perform cell measurement within the measurement gap. For example, the terminal device may perform measurement on inter-frequency cells or inter-system cells. In one measurement gap period, from the starting time, the terminal device starts performing measurement, the time length of the measurement performed by the terminal device may be the time length of the measurement gap, and at the ending time, the terminal device stops the measurement.

Figure 5A:
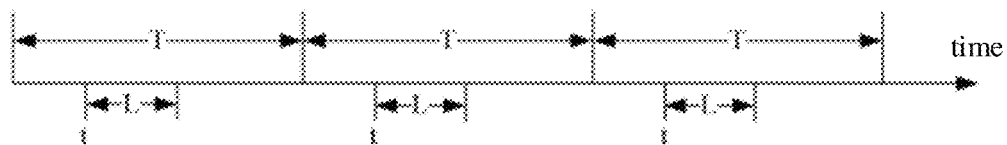
FIG. 5A is a schematic view of a periodic measurement interval parameter according to an embodiment of the present disclosure.

In the following, as shown in FIG. 5A, the periodic measurement gap parameter will be illustrated.

FIG. 5A is a schematic view of a periodic measurement interval parameter according to an embodiment of the present disclosure. As shown in FIG. 5A, the period of the measurement gap included in the measurement gap parameter may be T, the starting time in one period may be t, and the time length of the measurement gap is L. For example, the period of the measurement gap may be 4 ms, the starting time in one period may be 1 ms, and the time length of the measurement gap may be 1.5 ms. The terminal device may perform the measurement every 4 ms, the measurement may be started at the $1^{st}$ ms of each period, and the time length of each measurement may be 1.5 ms.

To be noted that, FIG. 5A illustrates the periodic measurement gap parameter by illustrating an example only, and does not limit the periodic measurement gap parameter.

When the measurement gap parameter is non-periodic, the measurement gap parameter may include a plurality of time lengths of measurement gaps, a starting time within each of the plurality of time lengths, and a time length of the measurement gap within each of the plurality of time lengths. Within each time length, the terminal device may perform measurement once. The time length of the measurement gap may be a time length that the terminal device performs measurement. In detail, the time length of the measurement gap may be indicated in a form of a bitmap.

Figure 5B:
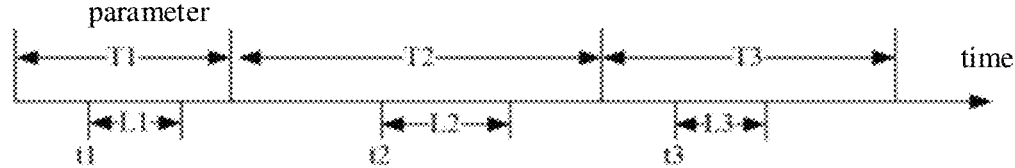
FIG. 5B is a schematic view of a non-periodic measurement interval parameter according to an embodiment of the present disclosure.

In the following, as shown in FIG. 5B, the non-periodic measurement gap parameter will be illustrated.

FIG. 5B is a schematic view of a non-periodic measurement interval parameter according to an embodiment of the present disclosure. As shown in FIG. 5B, the measurement gap parameter may include three measurement gap lengths (T1, T2, and T3, respectively). A starting time in the time length T1 may be t1, a starting time in the time length T2 may be t2, and a starting time in the time length T3 may be t3. The time length of the measurement gap in the time length T1 may be L1, the time length of the measurement gap in the time length T2 may be L2, and the time length of the measurement gap in the time length T3 may be L3. Some of the above T1, T2 and T3 may different, or T1, T2 and T3 are all different from each other. Some of the above t1, t2 and t3 may different, or t1, t2 and t3 are all different from each other. Some of the above L1, L2 and L3 may different, or L1, L2 and L3 are all different from each other. For example, the T1 may be 3 ms, t1 may be 1 ms, and L1 may be 1 ms. The terminal device may start performing the measurement at the $1^{st}$ ms of the time length T1, and the time length of the measurement may be 1 ms. The T2 may be 6 ms, t2 may be 2 ms, and L1 may be 2 ms. The terminal device may start performing the measurement at the $2^{nd}$ ms of the time length T2, and the time length of the measurement may be 2 ms.

In some embodiments, it may be indicated whether each time unit may be configured as the measurement gap. The time unit may be a symbol (symbol), a time slot (slot), a millisecond (ms), and so on. For example, the time unit may be 1 ms. Within 10 ms, locations of 0 ms, 1 ms, and 2 ms being indicated as a first value, such as 1, may indicate that locations of measurement gaps may be at 0 ms, 1 ms and 2 ms, and cell measurement may be performed at the locations of the measurement gaps. Within the 10 ms, locations of other time points (ms) being indicated as a second value, such as 0, may indicate that the other time points (ms) are not locations for measurement gaps, and cell measurement may not be performed at these time points (ms).

To be noted that, FIG. 5B illustrates the non-periodic measurement gap parameter by illustrating an example only, and does not limit the non-periodic measurement gap parameter.

In some embodiments, the network device may determine content included in the plurality of measurement parameters based on at least one of: a type of a measurement frequency point by the terminal device, a type of a system to be measured (such as inter-system, a type of a system supported by the neighboring cell, and so on), and the RRC status of the terminal device. The following cases may be included.

In a case 1, when frequency points corresponding to the TN cell to be measured by the terminal equipment are the same, the plurality of measurement parameters may include at least two SMTC parameters. Alternatively, the plurality of measurement parameters may include at least two SMTC parameters and at least two measurement gap parameters. That is, in this case, the plurality of measurement parameters may or may not include the measurement gap parameter.

In a case 2, when frequency points corresponding to the TN cell to be measured by the terminal device are different frequency points or frequency points of different systems, the plurality of measurement parameters may include a SMTC parameter and a measurement gap parameter.

In a case 3, when the terminal device uses a first signal to perform measurement, the plurality of measurement parameters may include at least two measurement gap parameters. The first signal may be a signal other than the SSB. For example, the first signal may be a channel state information reference signal (CSI-RS), a cell specific reference signal (CRS) (such as measurements within the LTE system). Alternatively, when the terminal device is in the RRC connected state, the terminal device can use the SSB or the CSI-RS to perform measurement. When the terminal device is in the RRC idle state or in the RRC inactive state, the terminal device may use the SSB to perform measurement. Alternatively, for inter-system measurement, such as LTE, measurements on the CRS, the CSI-RS and so on may be performed.

In an operation S302, the network device may send a plurality of measurement parameters to the terminal device.

Alternatively, the network device may send a first message to the terminal device, the first message may include the plurality of measurement parameters. The first message may be an RRC message or a system message.

Alternatively, the terminal device may determine or configure the plurality of measurement parameters only when the network device determines itself to be the NTN cell and/or determines the neighboring cell of the network device to include the TN cell, and that is, the operations S301 and/or S302 may be performed. The neighboring cell including the TN cell may refer to the neighboring cell being the TN cell or including the TN cell.

Alternatively, the terminal device may obtain a type of the neighboring cell, i.e. whether the neighboring cell is the TN cell, based on interaction with the network device, notification of a network element of a third network device (such as Access and Mobility Management Function (AMF)), notification of Operation Administration and Maintenance Management (OAM), and UE reporting (such as the UE reading system information of the neighboring cell to obtain the type of the neighboring cell).

In an operation S303, the terminal device may determine the first measurement parameter from the plurality of measurement parameters.

Alternatively, the terminal device may perform the operations S303-S304 only when the terminal device determines that the neighboring cell of the terminal device includes the TN cell. Alternatively, the terminal device may determine whether the neighboring cell is the TN cell or include the TN cell in following manners.

In a manner 1, the terminal device may determine whether the neighboring cell is/includes the TN cell based on the measurement frequency point.

The network device may configure the measurement frequency point to the terminal device. For example, the first message sent by the network device to the terminal device (refer to the operation S302) may include the measurement frequency point.

The network device may configure the measurement cell under the frequency point to the terminal device. For example, the first message sent by the network device to the terminal device (refer to the operation S302) may include the measurement cell.

Alternatively, the terminal device may determine whether the neighboring cell is/includes the TN cell based on the measurement frequency point. The NTN cell and the TN cell have different frequency points.

Alternatively, types of different frequency points may be indicated or predefined by the network. The network device may send to the terminal device a mapping relationship between frequency points and frequency point types.

Alternatively, the terminal device may determine whether the neighboring cell is/includes the TN cell based on the measurement frequency point and a type corresponding to the measurement frequency point. For example, the frequency point may indicate that the corresponding type is a NT type or a NTN type.

Alternatively, various frequency points and various types corresponding to the various frequency points may be indicated or predefined by the network. The network device may send the frequency point and the type corresponding to the frequency point to the end device.

Alternatively, the terminal device may determine the cell type based on the frequency point and/or cell information. For example, the terminal device may determine, based on the measurement frequency point and/or the cell information, a cell under the measurement frequency point and a type of the cell under the measurement frequency point (the NT cell or the NTN cell).

Alternatively, the network device may send the cell under the measurement frequency point and/or the type of the cell under the measurement frequency point to the terminal device.

Alternatively, the terminal device may determine the cell under the measurement frequency point and the type of the cell under the measurement frequency point based on a configuration file. The configuration file may be sent by the network device to the terminal device or may be predefined. For example, the configuration file may include the frequency point, the cell corresponding to the frequency point, and the type of the cell corresponding to the frequency point.

In a manner 2, the network device may send indication information to the terminal device, and the indication information may indicate whether the neighboring cell of the terminal device is/includes the TN cell.

In this manner, the terminal device may determine whether the TN cell is present in the neighboring cell based on the indication information.

In a manner 3, the terminal device may determine whether the network device sends a cell identifier of the TN cell or a list of TN cells to the terminal device.

In this manner, when the neighboring cell of the terminal device is the TN cell, or when the neighboring cell includes the TN cell, the network device may send the cell identifier of the TN cell or the list of TN cells to the terminal device (such as sending by broadcasting or dedicated signaling). Correspondingly, the terminal device receiving the cell identifier of the TN cell or the list of TN cells may indicate that the neighboring cell of the terminal device includes the TN cell. The terminal device not receiving the cell identifier of the TN cell or the list of TN cells may indicate that the neighboring cell of the terminal device does not include the TN cell.

In a manner 4, the terminal device may determine whether the neighboring cell is/includes the TN cell based on PLMN information.

The PLMN information may be PLMN information of the neighboring cell. PLMN information of the NTN cell and PLMN information of the TN cell may be different. Therefore, the terminal device may accurately determine whether the neighboring cell is/includes the TN cell based on the PLMN information.

The PLMN information may also be sent to the UE by the current network device (being sent by broadcasting or dedicated signaling), or may be obtained by the UE reading information of a neighboring system.

In a manner 5, the terminal device may determine whether the neighboring cell is/includes the TN cell based on measurement configuration information.

The terminal device may determine whether the neighboring cell is/includes the TN cell based on the number of configured or received measurement parameters. When a plurality of measurement parameters configured by the network are received, the neighboring cell may be the TN cell or may include the NT cell.

To be noted that the above-mentioned manners 1-5 only illustrate examples to describe a process that the terminal device determines whether the neighboring cell is a TN cell or whether the TN cell is included in the neighboring cell. The above description does not limit the process.

The terminal device may perform the operations S303-S304 only when the cell in which the terminal device is currently located is the NTN cell. The cell in which the terminal device is currently located being the NTN cell may be interpreted as the terminal device establishing connection with the NTN.

Alternatively, the terminal device may determine whether the cell in which the terminal device is currently located is the NTN cell based on second information. The second information may include at least one of: PLMN information, frequency point information, whether the plurality of measurement parameters being configured or indicated, third indication information indicating the cell type, configuration or indication of the measurement parameter, the number of measurement parameters configured for the terminal device, fourth indication information indicating that the number of measurement parameters configured for the terminal device is one, fifth indication information indicating that the number of measurement parameters configured for the terminal device is more than one, and sixth indication information indicating a type of the frequency point.

The terminal device may determine whether the cell in which the terminal device is currently located is the NTN cell in following manners.

In a manner 1, the terminal device may determine whether the cell in which the terminal device is currently located is the NTN cell based on the PLMN information.

The PLMN information may be PLMN information of the cell in which the terminal device is currently located. The PLMN information of the NTN cell and the PLMN information of the TN cell may be different. Therefore, the terminal device may accurately determine whether cell in which the terminal device is currently located is the NTN cell based on the PLMN information.

In a manner 2, the terminal device may determine whether the cell in which the terminal device is currently located is the NTN cell based on the frequency point information.

When the current frequency point is an NTN frequency point, the cell is the NTN cell.

In a manner 3, the terminal device may determine whether the cell in which the terminal device is currently located is the NTN cell based on the configuration or indication of the measurement parameter.

Configuration or indication of the measurement parameter may include: one measurement parameter being configured for the terminal device, or a plurality of measurement parameters being configured for the terminal device.

The number of measurement parameters in the plurality of measurement parameters may refer to the number of SMTC parameters and/or the number of measurement gap parameters. For example, the number of the plurality of measurement parameters may be a maximum of the number of SMTC parameters and the number of measurement gap parameters. That is, when one of the number of SMTC parameters and the number of measurement gap parameters is more than one, the number of measurement parameters may be more than one.

Alternatively, the number of measurement parameters may be determined based on a type of a parameter (the SMTC parameter or the measurement gap parameter) required by the terminal device to perform the measurement.

When the terminal device requires the SMTC parameter to perform the measurement, the number of measurement parameters configured for the terminal device may be: the number of SMTC parameters configured for the terminal device.

When the terminal device requires the measurement gap parameter to perform the measurement, the number of measurement parameters configured for the terminal device may be: the number of measurement gap parameters configured for the terminal device.

When the terminal device requires the SMTC parameter and the measurement gap parameter to perform the measurement, the number of measurement parameters configured for the terminal device may be the maximum of the number of SMTC parameters configured for the terminal device and the number of measurement gap parameters configured for the terminal device. For example, when the number of SMTC parameters configured for the terminal device is 1, and the number of measurement gap parameters configured for the terminal device is 2, the number of measurement parameters configured for the terminal device may be determined as 2.

When the plurality of measurement parameters are configured for the terminal device, the terminal device may determine that the cell in which the terminal device is currently located is the NTN cell. When one measurement parameter is configured for the terminal device, the terminal device may determine that the cell in which the terminal device is currently located is the NT cell. Alternatively, the base station may be the satellite and the like. In this manner, the terminal device may determine whether the cell in which the terminal device is currently located is the NTN cell without requiring the network device to send additional information to the terminal device.

In a manner 4, the terminal device may determine whether the cell in which the terminal device is currently located is the NTN cell based on the third indication information.

The third indication information may be configured to indicate a type of the cell in which the terminal device is currently located. When the third indication information indicates that the cell type is a NTN type, the terminal device may determine that the cell in which the terminal device is currently located is the NTN cell. When the third indication information indicates that the cell type is a TN type, the terminal device may determine that the cell in which the terminal device is currently located is the TN cell.

In a manner 5, the terminal device may determine whether the cell in which the terminal device is currently located is the NTN cell based on the number of measurement parameters configured for the terminal device by the network device.

In this manner, the number of measurement parameters configured by the network device for the terminal device may be indicated by implicit means. That is, when more than one measurement parameters are configured, the terminal device may determine whether the cell in which the terminal device is currently located is the NTN cell. When more than one measurement parameters are configured for the terminal device, the terminal device may determine that the cell in which the terminal device is currently located is the NTN cell. When one measurement parameter is configured for the terminal device, the terminal device may determine that the cell in which the terminal device is currently located is the NT cell.

For example, when at least two SMTC parameters are configured, the currently cell may be the NTN cell.

For example, when at least two measurement gap parameters are configured, the currently cell may be the NTN cell.

In a manner 6, the terminal device may determine whether the cell in which the terminal device is currently located is the NTN cell based on the fourth indication information or the fifth indication information.

The fourth indication information may be configured to indicate that the number of measurement parameters configured for the terminal device is one. The fifth indication information may be configured to indicate that the number of measurement parameters configured for the terminal device is more than one. The number of measurement parameters configured for the terminal device may include: the number of SMTC parameters configured for the terminal device and/or the number of measurement gap parameters configured for the terminal device. That is, the fifth indication information may be configured to indicate that the number of SMTC parameters configured for the terminal device is one or more, and/or indicate that the number of measurement gap parameters configured for the terminal device is one or more.

At least one of the following situations may be included.

When the SMTC parameter are required for the terminal device to perform the measurement, the fourth indication information may be configured to indicate that the number of SMTC parameters configured for the terminal device is one. The fifth indication information may indicate that the number of SMTC parameters configured for the terminal device is more than one. When the terminal device receives the fourth indication information, the terminal device may determine that the cell in which the terminal device is currently located is the TN cell. When the terminal device receives the fifth indication information, the terminal device may determine that the cell in which the terminal device is currently located is the NTN cell.

When the terminal device requires the measurement gap parameter to perform measurement, the fourth indication information may be configured to indicate that the number of measurement gap parameters configured for the terminal device is one, and the fifth indication information may be configured to indicate that the number of measurement gap parameters configured for the terminal device is more than one. When the terminal device receives the fourth indication information, the terminal device may determine that the cell in which the terminal device is currently located is the TN cell. When the terminal device receives the fourth and fifth indication information, the terminal device may determine that the cell in which the terminal device is currently located is the NTN cell.

When the terminal device requires the SMTC parameter and/or the measurement gap parameter to perform measurement, the fourth indication information may be configured to indicate that the number of measurement gap parameters configured for the terminal device is one and the number of SMTC parameters configured for the terminal device is one; and the fifth indication information may be configured to indicate that the number of measurement interval parameters configured for the terminal device is more than one or the number of SMTC parameters configured for the terminal device is more than one. When the terminal device receives the fourth indication information, the terminal device may determine that the cell in which the terminal device is currently located is the TN cell. When the terminal device receives the fifth indication information, the terminal device may determine that the cell in which the terminal device is currently located is the NTN cell.

In a manner 7, the terminal device may determine whether the frequency point that the terminal device is currently located is an NTN frequency point based on the sixth indication information.

The sixth indication information may be configured to indicate a type of the frequency point. When the sixth indication information indicates that the frequency point that the terminal device is currently located is the NTN frequency point, the cell in which the terminal device is currently located may be the NTN cell.

To be noted that in the above manners 1-7, "more than one" may refer to 2 or more than 2. The above-mentioned manners 1-5 are only examples of the process of determining whether the terminal device is located in the NTN cell, and do not limit the process.

Alternatively, the terminal device may determine the first measurement parameter from the plurality of measurement parameters based on first information and/or first configuration information.

The first information may include at least one of: a location of the terminal device, deployment information of the NTN, a moving track of the terminal device, an astrological Calendar of the NTN, deployment or location information of the TN, a distance between the terminal device and the network device, a distance between the terminal device and a ground reference point, an RTT between the terminal device and the network device, a timing advance TA between the terminal device and the network device, a link loss between the terminal device and the network device, RSRP between the terminal device and the network device, and so on.

The network device may be a network device in the NT or a network device in the NTN.

The deployment information of the NTN may include a location of the satellite, a moving track of the satellite, a coverage range of the NTN cell, a radius of the coverage range of the NTN cell, and a type of the satellite (such as GEO or LEO, and so on). The deployment information of the TN may include a location of the network device (such as the base station), a radius of the network device, and a coverage area of the network device.

The distance between the terminal device and the network device may include: a distance between the terminal device and the network device under the NTN (also referred to as a distance between the terminal device and the NTN), a distance between the terminal device and the network device under the TN (also referred to as a distance between the terminal device and the TN).

The terminal device may obtain the first information from the network device. For example, the terminal device may receive the first information sent by the network device. The terminal device may also obtain the first information by other means, such as by locating, being indicated by a third device, and so on. The present embodiment does not limit how to obtain the first information.

The first configuration information may be configured to indicate a condition of activating the measurement parameter. The condition of activating the measurement parameter may be a condition of using a different reference parameter, or a condition of selecting a different measurement parameter. That is, when the activation condition of a certain measurement parameter is satisfied, the certain measurement parameter may be selected. For example, the first configuration information may include a condition for activating each SMTC parameter and/or a condition for activating each measurement gap parameter. Alternatively, the activation condition may be an activation threshold, and the activation threshold may include at least one of: a distance threshold, a TA threshold, an RTT threshold.

For example, when the plurality of measurement parameters include a SMTC parameter 1, a SMTC parameter 2, a measurement gap parameter 1, and a measurement gap parameter 2, the first configuration information may include: an activation condition 1 corresponding to the SMTC parameter 1, an activation condition 2 corresponding to the SMTC parameter 2, an activation condition 3 corresponding to the measurement gap parameter 1, and an activation condition 4 corresponding to the measurement gap parameter 2. When the activation condition 1 is satisfied, the SMTC parameter 1 may be selected. When the activation condition 2 is satisfied, the SMTC parameter 2 may be selected. Further, the activation condition 1 and the activation condition 2 cannot be satisfied at the same time. When the activation condition 3 is satisfied, the measurement gap parameter 1 may be selected. When the activation condition 4 is satisfied, the measurement gap parameter 2 may be selected. The activation condition 3 and the activation condition 4 cannot be satisfied at the same time.

The terminal device may obtain the first configuration information from the network device. Alternatively, the terminal device may receive the first configuration information sent by the network device. For example, the terminal device may receive the first information sent by the network device, the first information may include the first configuration information, and the first information may be referred to the operation S302 and will not be repeatedly described here.

The first measurement parameter may include the SMTC parameter and/or the measurement gap parameter. The SMTC parameter and the measurement gap parameter may be selected by the terminal device from the plurality of measurement parameters. The SMTC parameter may be selected by the terminal device from at least two STMC parameters (configured in the plurality of measurement parameters), and the measurement gap parameter may be selected by the terminal device from at least two measurement gap parameters (configured in the plurality of measurement parameters).

The terminal device may determine the content included in the first measurement parameter based on the frequency point corresponding to the TN cell to be measured and/or a type of a measurement system.

Alternatively, when frequency points corresponding to the TN cell are intra-frequency points, the first measurement parameter may include the SMTC parameter.

Alternatively, when frequency points corresponding to the TN cell are inter-frequency points or inter-system points, the first measurement parameter may include the SMTC parameter and the measurement gap parameter.

Alternatively, when the terminal device takes a first signal to perform measurement, the first measurement parameter may include the measurement gap parameter. The first signal may be a signal other than the SSB. For example, the first signal may be the CSI-RS, the CRS, and so on.

In an operation S304, the terminal device may measure the TN cell based on the first measurement parameter.

The TN cell may be the neighboring cell of the terminal device, and the type of the TN cell may be the TN type.

The terminal device may determine the TN cell first, and subsequently, measure the TN cell based on the first measurement parameter.

The terminal device may determine the TN cell in the following manners.

In a manner 1, the terminal device may determine the TN cell based on the measurement frequency point.

In this manner, the network device may send the measurement frequency point to the terminal device, such that the terminal device may determine the TN cell based on the measurement frequency point.

Alternatively, the terminal device may determine the TN cell (the cell in the TN type) under the measurement frequency point as the TN cell.

For example, the network device may send an identifier of the TN cell corresponding to the measurement frequency point to the terminal device, such that the terminal device may determine the TN cell under the measurement frequency point based on the identifier of the TN cell. The network device may send first indication information to the terminal device, and the first indication information may be configured to indicate the type of the cell corresponding to the measurement frequency point. The type of the cell may be the NTN type or the NT type.

For example, the terminal device may obtain the identifier of the TN cell under the measurement frequency point in the configuration file to determine the TN cell under the measurement frequency point. The configuration file may be sent by the network device to the terminal device, or predefined, and so on.

In a manner 2, the network device may send the identifier of the TN cell to the terminal device.

After the terminal device receives the identifier of the TN cell sent by the network device, the terminal device may determine a first NT cell based on the identifier of the TN cell sent by the network device.

Alternatively, the network device may further send second indication information to the terminal device, and the second indication information may be configured to indicate the type of the TN cell. For example, the second indication information may be configured to indicate that the type of the TN cell is the TN type.

The terminal device may also determine the TN cell in other manners, which will not be limited by the present disclosure.

Contents included in the first measurement parameter may determine the process that the terminal device performs the measurement on the TN cell. Following three cases may be included.

In a case 1, the first measurement parameter includes the SMTC parameter.

In this case, the terminal device may receive the SSB sent by the network device based on the SMTC parameter and measure the TN cell based on the SSB.

Alternatively, the terminal device can determine a receiving time point based on the SMTC parameter and receive the SSB sent by the network device at the receiving time point.

In a case 2, the first measurement parameter may include the SMTC parameter and the measurement gap parameter.

In this case, the terminal device may receive the SSB sent by the network device based on the SMTC parameter. The terminal device may determine a measurement time for the TN cell based on the measurement gap parameter, and perform measurement on the TN cell based on the SSB during the measurement time.

In some embodiments, the terminal device may determine the receiving time point based on the SMTC parameter, and receive the SSB sent by the network device at the receiving time point.

In a case 3, the first measurement parameter may include the measurement gap parameter.

In this case, the terminal device may determine the measurement time to perform measurement on the TN cell based on the measurement gap parameter, may perform measurement on the TN cell based on the first signal during the measurement time. The first signal is a signal other than SSB, for example, the first signal may be the CSI-RS, the CRS, and so on.

To be noted that, when the NTN cell is present in the neighboring cell of the terminal device, the terminal device may perform measurement on the NTN cell. The terminal device may perform measurement on the NTN cell by taking a second measurement parameter. The second measurement parameter may include the SMTC parameter and/or the measurement gap parameter. In some embodiments, the second measurement parameter may be a measurement parameter in addition to the plurality of measurement parameters. For example, the second measurement parameter may be configured by the network device for the terminal device for the NTN cell. Alternatively, the second measurement parameter may be a parameter of the plurality of measurement parameters. The terminal device may select the second measurement parameter from the plurality of measurement parameters. Rules for the terminal device to select the second measurement parameter may be configured by the network device or may be predefined.

According to the measurement method provided by the embodiments of the present disclosure, the network device may configure the plurality of measurement parameters for the terminal device, such that the terminal device may select the first measurement parameter from the plurality of measurement parameters based on actual situations (such as based on the distance between the terminal device and the network device, based on the TA, based on the RTT, and so on), and may perform measurement on the TN cell based on the first measurement parameter. In this way, a situation that the terminal device is unable to discover the TN cell in time or performs measurement frequently may be prevented, and communication performance between the terminal device and the network device may be improved.

Based on any of the above embodiments, a process of selecting the first measurement detection parameter from at least two measurement gap parameters and a process of selecting a first measurement detection parameter from the at least two measurement gap parameters will be described in the following.

The process of the terminal device selecting the measurement gap parameter from the at least two measurement gap parameters will be described in the following. The process may be achieved in the following manners.

In a manner 1, the terminal device may select the measurement gap parameter from the at least two measurement gap parameters based on the distance between the terminal device and the NTN.

The terminal device may obtain the distance between the terminal device and the NTN at first, and subsequently, select the measurement gap parameter from the at least two measurement gap parameters based on the distance between the terminal device and the NTN. The terminal device may obtain the distance between the terminal device and the NTN from the first information. Alternatively, the terminal device may determine the distance between the terminal device and the NTN based on the astronomical calendar of the NT, the radius of the coverage range of the NTN, and the location of the terminal device. Of course, the terminal device may alternatively determine the distance to the NTN by other means.

In some embodiments, a corresponding relationship between the measurement period and the distance or a corresponding relationship between the measurement gap (time between two measurements) and the distance may be set in advance. The measurement period or the measurement gap may be negatively correlated with the distance. That is, the smaller the distance, the larger the measurement period or the larger the measurement gap; and the larger the distance, the smaller the measurement period or the smaller the measurement gap. Accordingly, the terminal device may determine the measurement gap parameter from the at least two measurement gap parameters based on the distance between the terminal device and the NTN and the corresponding relationship.

In some embodiments, when the plurality of measurement parameters include two measurement gap parameters, a first distance threshold may be obtained from the activation condition. When the distance between the terminal device and the NTN is less than or equal to the first distance threshold, a greater one of the two measurement gap parameters (the measurement period and the measurement gap) may be determined as the measurement gap parameter. When the distance between the terminal device and the NTN is greater than the first distance threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a second distance threshold and a third distance threshold may be obtained from the activation condition. When the distance between the terminal device and the NTN is less than or equal to the second distance threshold, the measurement gap parameter 3 may be determined as the measurement gap parameter. When the distance between the terminal device and the NTN is greater than the second distance threshold and less than or equal to the third distance threshold, the measurement gap parameter 2 may be determined as the measurement gap parameter. When the distance between the terminal device and the NTN is greater than the third distance threshold, the measurement gap parameter 1 may be determined as the measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The second distance threshold may be less than the third distance threshold.

In a manner 2, the terminal device may select the measurement gap parameter from the at least two measurement gap parameters based on the distance between the terminal device and the TN.

The terminal device may obtain the distance between the terminal device and the TN at first, and subsequently, select the measurement gap parameter from the at least two measurement gap parameters based on the distance between the terminal device and the TN. The terminal device may obtain the distance between the terminal device and the TN from the first information. Alternatively, the terminal device may determine the distance between the terminal device and the TN based on the location of the terminal device and a location of the network device under the TN, the coverage area/a radius of the coverage area of the TN network device. Of course, the terminal device may determine the distance between the terminal device and the TN by other means.

In some embodiments, a corresponding relationship between the measurement period and the distance or a corresponding relationship between the measurement gap (time between two measurements) and the distance may be set in advance. The measurement period or the measurement gap may be positively correlated with the distance. That is, the smaller the distance, the smaller the measurement period or the smaller the measurement gap; and the larger the distance, the larger the measurement period or the larger the measurement gap. Accordingly, the terminal device may determine the measurement gap parameter from the at least two measurement gap parameters based on the distance between the terminal device and the TN and the corresponding relationship.

In some embodiments, when the plurality of measurement parameters include two measurement gap parameters, a fourth distance threshold may be obtained from the activation condition. When the distance between the terminal device and the TN is greater than or equal to the fourth distance threshold, a greater one of the two measurement gap parameters (the measurement period and the measurement gap) may be determined as the measurement gap parameter. When the distance between the terminal device and the TN is less than the fourth distance threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a fifth distance threshold and a sixth distance threshold may be obtained from the activation condition. When the distance between the terminal device and the TN is less than or equal to the fifth distance threshold, the measurement gap parameter 1 may be determined as the fifth measurement gap parameter. When the distance between the terminal device and the TN is greater than the fifth distance threshold and less than or equal to the sixth distance threshold, the measurement gap parameter 2 may be determined as the fifth measurement gap parameter. When the distance between the terminal device and the TN is greater than the sixth distance threshold, the measurement gap parameter 3 may be determined as the fifth measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The fifth distance threshold may be less than the sixth distance threshold.

In a manner 3, the terminal device may select the measurement gap parameter from the at least two measurement gap parameters based on TA between the terminal device and the NTN.

The terminal device may obtain TA between the terminal device and the NTN at first, and subsequently, select the measurement gap parameter from the at least two measurement gap parameters based on the TA between the terminal device and the NTN. The terminal device may obtain the TA between the terminal device and the NTN from the first information.

In some embodiments, a corresponding relationship between the measurement period and the TA or a corresponding relationship between the measurement gap (time between two measurements) and the TA may be set in advance. The measurement period or the measurement gap may be negatively correlated with the TA. That is, the smaller the TA, the greater the measurement period or the greater the measurement gap; and the greater the TA, the smaller the measurement period or the smaller the measurement gap. Accordingly, the terminal device may determine the measurement gap parameter from the at least two measurement gap parameters based on the TA between the terminal device and the NTN and the corresponding relationship.

In some embodiments, when the plurality of measurement parameters include two measurement gap parameters, a TA threshold may be obtained from the activation condition. When the TA between the terminal device and the NTN is less than or equal to the TA threshold, a greater one of the two measurement gap parameters (the measurement period and the measurement gap) may be determined as the measurement gap parameter. When the TA between the terminal device and the NTN is greater than the TA threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a first TA threshold and a second TA threshold may be obtained from the activation condition. When the TA between the terminal device and the NTN is less than or equal to the first TA threshold, the measurement gap parameter 3 may be determined as the measurement gap parameter. When the TA between the terminal device and the NTN is greater than the first TA threshold and less than or equal to the second TA threshold, the measurement gap parameter 2 may be determined as the measurement gap parameter. When the TA between the terminal device and the NTN is greater than the second TA threshold, the measurement gap parameter 1 may be determined as the measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The first TA threshold may be less than the second TA threshold.

In a manner 4, the terminal device may select the measurement gap parameter from the at least two measurement gap parameters based on the TA between the terminal device and the TN.

The terminal device may obtain TA between the terminal device and the TN at first, and subsequently, select the measurement gap parameter from the at least two measurement gap parameters based on the TA between the terminal device and the TN. The terminal device may obtain the TA between the terminal device and the TN from the first information.

In some embodiments, a corresponding relationship between the measurement period and the TA or a corresponding relationship between the measurement gap (time between two measurements) and the TA may be set in advance. The measurement period or the measurement gap may be positively correlated with the TA. That is, the smaller the TA, the smaller the measurement period or the smaller the measurement gap; and the greater the TA, the greater the measurement period or the greater the measurement gap. Accordingly, the terminal device may determine the measurement gap parameter from the at least two measurement gap parameters based on the TA between the terminal device and the TN and the corresponding relationship.

In some embodiments, when the plurality of measurement parameters include two measurement gap parameters, a TA threshold may be obtained from the activation condition. When the TA between the terminal device and the TN is greater than or equal to the TA threshold, a greater one of the two measurement gap parameters (the measurement period and the measurement gap) may be determined as the measurement gap parameter. When the TA between the terminal device and the TN is less than the TA threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a first TA threshold and a second TA threshold may be obtained from the activation condition. When the TA between the terminal device and the TN is less than or equal to the first TA threshold, the measurement gap parameter 1 may be determined as the measurement gap parameter. When the TA between the terminal device and the TN is greater than the first TA threshold and less than or equal to the second TA threshold, the measurement gap parameter 2 may be determined as the measurement gap parameter. When the TA between the terminal device and the TN is greater than the second TA threshold, the measurement gap parameter 3 may be determined as the measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The first TA threshold may be less than the second TA threshold.

In a manner 5, the terminal device may select the measurement gap parameter from the at least two measurement gap parameters based on the link loss between the terminal device and the TN.

The terminal device may obtain a link loss between the terminal device and the TN at first, and subsequently, select the measurement gap parameter from the at least two measurement gap parameters based on the link loss between the terminal device and the TN. The terminal device may obtain the link loss between the terminal device and the TN from the first information, or obtain the link loss based on location information and the like.

In some embodiments, a corresponding relationship between the measurement period and the link loss or a corresponding relationship between the measurement gap (time between two measurements) and the link loss may be set in advance. The measurement period or the measurement gap may be positively correlated with the link loss. That is, the smaller the link loss, the smaller the measurement period or the smaller the measurement gap; and the greater the link loss, the greater the measurement period or the greater the measurement gap. Accordingly, the terminal device may determine the measurement gap parameter from the at least two measurement gap parameters based on the link loss between the terminal device and the TN and the corresponding relationship.

In some embodiments, when the plurality of measurement parameters include two measurement gap parameters, a link loss threshold may be obtained from the activation condition. When the link loss between the terminal device and the TN is greater than or equal to the link loss threshold, a greater one of the two measurement gap parameters (the measurement period and the measurement gap) may be determined as the measurement gap parameter. When the link loss between the terminal device and the TN is less than the link loss threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a first link loss threshold and a second link loss threshold may be obtained from the activation condition. When the link loss between the terminal device and the TN is less than or equal to the first link loss threshold, the measurement gap parameter 1 may be determined as the measurement gap parameter. When the link loss between the terminal device and the TN is greater than the first link loss threshold and less than or equal to the second link loss threshold, the measurement gap parameter 2 may be determined as the measurement gap parameter. When the link loss between the terminal device and the TN is greater than the second link loss threshold, the measurement gap parameter 3 may be determined as the measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The first link loss threshold may be less than the second link loss threshold.

In a manner 6, the terminal device may select the measurement gap parameter from the at least two measurement gap parameters based on a measured value of a reference signal, such as RSRP, between the terminal device and the TN.

The terminal device may obtain the measured value of the reference signal, such as RSRP, between the terminal device and the TN at first, and subsequently, select the measurement gap parameter from the at least two measurement gap parameters based on the measured value of the reference signal, such as RSRP, between the terminal device and the TN. The terminal device may obtain the measured value of the reference signal, such as RSRP, between the terminal device and the TN from the first information.

In some embodiments, a corresponding relationship between the measurement period and the measured value of the reference signal, such as RSRP, or a corresponding relationship between the measurement gap (time between two measurements) and the measured value of the reference signal, such as RSRP, may be set in advance. The measurement period or the measurement gap may be negatively correlated with the measured value of the reference signal, such as RSRP. That is, the greater the link loss, the smaller the measurement period or the smaller the measurement gap; and the smaller the link loss, the greater the measurement period or the greater the measurement gap. Accordingly, the terminal device may determine the measurement gap parameter from the at least two measurement gap parameters based on the measured value of the reference signal, such as RSRP, between the terminal device and the TN and the corresponding relationship.

In some embodiments, when the plurality of measurement parameters include two measurement gap parameters, an RSRP threshold may be obtained from the activation condition. When the RSRP between the terminal device and the TN is less than or equal to the RSRP threshold, a greater one of the two measurement gap parameters (the measurement period and the measurement gap) may be determined as the measurement gap parameter. When the RSRP between the terminal device and the TN is greater than the RSRP threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a first RSRP threshold and a second RSRP threshold may be obtained from the activation condition. When the RSRP between the terminal device and the TN is less than or equal to the first RSRP threshold, the measurement gap parameter 1 may be determined as the measurement gap parameter. When the RSRP between the terminal device and the TN is greater than the first RSRP threshold and less than or equal to the second RSRP threshold, the measurement gap parameter 2 may be determined as the measurement gap parameter. When the RSRP between the terminal device and the TN is greater than the second RSRP threshold, the measurement gap parameter 3 may be determined as the measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The first RSRP threshold may be less than the second RSRP threshold.

In a manner 7, the terminal device may select the measurement gap parameter from the at least two measurement gap parameters based on an RTT between the terminal device and the NTN.

The terminal device may obtain the RTT between the terminal device and the NTN at first, and subsequently, select the measurement gap parameter from the at least two measurement gap parameters based on the RTT between the terminal device and the NTN. The terminal device may obtain the RTT between the terminal device and the NTN from the first information. Alternatively, the terminal device may obtain the RTT between the terminal device and the NTN based on locating information.

In some embodiments, a corresponding relationship between the measurement period and the RTT or a corresponding relationship between the measurement gap (time between two measurements) and the RTT may be set in advance. The measurement period or the measurement gap may be negatively correlated with the RTT. That is, the smaller the RTT, the greater the measurement period or the greater the measurement gap; and the greater the RTT, the smaller the measurement period or the smaller the measurement gap. Accordingly, the terminal device may determine the measurement gap parameter from the at least two measurement gap parameters based on the RTT between the terminal device and the NTN and the corresponding relationship.

In some embodiments, when the plurality of measurement parameters include two measurement gap parameters, an RTT threshold may be obtained from the activation condition. When the RTT between the terminal device and the NTN is less than or equal to the RTT threshold, a greater one of the two measurement gap parameters (the measurement period and the measurement gap) may be determined as the measurement gap parameter. When the RTT between the terminal device and the NTN is greater than the RTT threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), a first RTT threshold and a second RTT threshold may be obtained from the activation condition. When the RTT between the terminal device and the NTN is less than or equal to the first RTT threshold, the measurement gap parameter 3 may be determined as the measurement gap parameter. When the RTT between the terminal device and the NTN is greater than the first RTT threshold and less than or equal to the second RTT threshold, the measurement gap parameter 2 may be determined as the measurement gap parameter. When the RTT between the terminal device and the NTN is greater than the second RTT threshold, the measurement gap parameter 1 may be determined as the measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The first RTT threshold may be less than the second RTT threshold.

In a manner 8, the terminal device may select the measurement gap parameter from the at least two measurement gap parameters based on a distance between the terminal device and a ground reference point.

In this manner, the cell that the terminal device is located may be a GEO cell. The ground reference point may be a ground reference point that is directly below the GEO.

The terminal device may obtain the distance between the terminal device and the ground reference point at first, and subsequently, select the measurement gap parameter from the at least two measurement gap parameters based on the distance between the terminal device and the ground reference point. The terminal device may obtain the distance between the terminal device and the ground reference point from the first information. Alternatively, the terminal device may obtain the distance between the terminal device and the ground reference point based on locating information.

In some embodiments, a corresponding relationship between the measurement period and the distance between the terminal device and the ground reference point or a corresponding relationship between the measurement gap (time between two measurements) and the distance between the terminal device and the ground reference point may be set in advance. The measurement period or the measurement gap may be negatively correlated with the distance. That is, the smaller the distance, the greater the measurement period or the greater the measurement gap; and the greater the distance, the smaller the measurement period or the smaller the measurement gap. Accordingly, the terminal device may determine the measurement gap parameter from the at least two measurement gap parameters based on the distance between the terminal device and the ground reference point and the corresponding relationship.

In some embodiments, when the plurality of measurement parameters include two measurement gap parameters, a seventh distance threshold may be obtained from the activation condition. When the distance between the terminal device and the ground reference point is less than or equal to the seventh distance threshold, a greater one of the two measurement gap parameters (the measurement period and the measurement gap) may be determined as the measurement gap parameter. When the distance between the terminal device and the ground reference point is greater than the seventh distance threshold, a smaller one of the two measurement gap parameters (the measurement period and the measurement gap) may be determined as the measurement gap parameter.

In some embodiments, when the plurality of measurement parameters include three measurement gap parameters (recorded as a measurement gap parameter 1, a measurement gap parameter 2 and a measurement gap parameter 3), an eighth distance threshold and a ninth distance threshold may be obtained from the activation condition. When the distance between the terminal device and the ground reference point is less than or equal to the eighth distance threshold, the measurement gap parameter 3 may be determined as the eighth measurement gap parameter. When the distance between the terminal device and the ground reference point is greater than the eighth distance threshold and less than or equal to the ninth distance threshold, the measurement gap parameter 2 may be determined as the eighth measurement gap parameter. When the distance between the terminal device and the ground reference point is greater than the ninth distance threshold, the measurement gap parameter 1 may be determined as the eighth measurement gap parameter. A period or a gap of the measurement gap parameter 3 may be greater than a period or a gap of the measurement gap parameter 2. The period or the gap of the measurement gap parameter 2 is greater than a period or a gap of the measurement gap parameter 1. The eighth distance threshold may be less than the ninth distance threshold.

In the following, the process of the terminal device selecting a SMTC parameter from at least two SMTC parameters will be described. The process may be achieved in the following manners.

In a manner 1, the terminal device may select the SMTC parameter from the at least two SMTC parameters based on the distance between the terminal device and the NTN.

The terminal device may obtain the distance between the terminal device and the NTN at first, and subsequently, select the SMTC parameter from the at least two SMTC parameters based on the distance between the terminal device and the NTN. The terminal device may obtain the distance between the terminal device and the NTN from the first information. Alternatively, the terminal device may determine the distance between the terminal device and the NTN based on the astronomical calendar of the NTN, a radius of a coverage area of the NTN, and the location of the terminal device. Alternatively, the terminal device may determine the distance between the terminal device and the NTN by other means.

In some embodiments, a corresponding relationship between an SMTC period and the distance or a corresponding relationship between an SMTC gap (time between two SMTCs) and the distance may be set in advance. The SMTC period or the SMTC gap may be negatively correlated with the distance. That is, the smaller the distance, the greater the SMTC period or the greater the SMTC gap; and the greater the distance, the smaller the SMTC period or the smaller the SMTC gap. Accordingly, the terminal device may determine the SMTC parameter from the at least two SMTC parameters based on the distance between the terminal device and the NTN and the corresponding relationship.

In some embodiments, when the plurality of measurement parameters include two SMTC parameters, a first distance threshold may be obtained from the activation condition. When the distance between the terminal device and the NTN is less than or equal to the first distance threshold, a greater one of the two SMTC parameters (the SMTC period and the SMTC gap) may be determined as the SMTC parameter. When the distance between the terminal device and the NTN is greater than the first distance threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a second distance threshold and a third distance threshold may be obtained from the activation condition. When the distance between the terminal device and the NTN is less than or equal to the second distance threshold, the SMTC parameter 3 may be determined as the SMTC parameter. When the distance between the terminal device and the NTN is greater than the second distance threshold and less than or equal to the third distance threshold, the SMTC parameter 2 may be determined as the SMTC parameter. When the distance between the terminal device and the NTN is greater than the third distance threshold, the SMTC parameter 1 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The second distance threshold may be less than the third distance threshold.

In a manner 2, the terminal device may select the SMTC parameter from the at least two SMTC parameters based on the distance between the terminal device and the TN.

The terminal device may obtain the distance between the terminal device and the TN at first, and subsequently, select the SMTC parameter from the at least two SMTC parameters based on the distance between the terminal device and the TN. The terminal device may obtain the distance between the terminal device and the TN from the first information. Alternatively, the terminal device may determine the distance between the terminal device and the NTN based on the location of the terminal device and the location of a network device under the TN. Alternatively, the terminal device may determine the distance between the terminal device and the TN by other means.

In some embodiments, a corresponding relationship between the SMTC period and the distance or a corresponding relationship between the SMTC gap (time between two SMTCs) and the distance may be set in advance. The SMTC period or the SMTC gap may be positively correlated with the distance. That is, the smaller the distance, the smaller the SMTC period or the smaller the SMTC gap; and the greater the distance, the greater the SMTC period or the greater the SMTC gap. Accordingly, the terminal device may determine the SMTC parameter from the at least two SMTC parameters based on the distance between the terminal device and the TN and the corresponding relationship.

In some embodiments, when the plurality of measurement parameters include two SMTC parameters, a fourth distance threshold may be obtained from the activation condition. When the distance between the terminal device and the TN is greater than or equal to the fourth distance threshold, a greater one of the two SMTC parameters (the SMTC period and the SMTC gap) may be determined as the SMTC parameter. When the distance between the terminal device and the TN is less than the fourth distance threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a fifth distance threshold and a sixth distance threshold may be obtained from the activation condition. When the distance between the terminal device and the TN is less than or equal to the fifth distance threshold, the SMTC parameter 1 may be determined as the fifth SMTC parameter. When the distance between the terminal device and the TN is greater than the fifth distance threshold and less than or equal to the sixth distance threshold, the SMTC parameter 2 may be determined as the fifth SMTC parameter. When the distance between the terminal device and the TN is greater than the sixth distance threshold, the SMTC parameter 3 may be determined as the fifth SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The fifth distance threshold may be less than the sixth distance threshold.

In a manner 3, the terminal device may select the SMTC parameter from the at least two SMTC parameters based on the TA between the terminal device and the NTN.

The terminal device may obtain the TA between the terminal device and the NTN at first, and subsequently, select the SMTC parameter from the at least two SMTC parameters based on the TA between the terminal device and the NTN. The terminal device may obtain the TA between the terminal device and the NTN from the first information.

In some embodiments, a corresponding relationship between the SMTC period and the TA or a corresponding relationship between the SMTC gap (time between two SMTCs) and the TA may be set in advance. The SMTC period or the SMTC gap may be negatively correlated with the TA. That is, the smaller the TA, the greater the SMTC period or the greater the SMTC gap; and the greater the TA, the smaller the SMTC period or the smaller the SMTC gap. Accordingly, the terminal device may determine the SMTC parameter from the at least two SMTC parameters based on the TA between the terminal device and the NTN and the corresponding relationship.

In some embodiments, when the plurality of measurement parameters include two SMTC parameters, a TA threshold may be obtained from the activation condition. When the TA between the terminal device and the NTN is less than or equal to the TA threshold, a greater one of the two SMTC parameters (the SMTC period and the SMTC gap) may be determined as the SMTC parameter. When the TA between the terminal device and the NTN is greater than the TA threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a first TA threshold and a second TA threshold may be obtained from the activation condition. When the TA between the terminal device and the NTN is less than or equal to the first TA threshold, the SMTC parameter 3 may be determined as the SMTC parameter. When the TA between the terminal device and the NTN is greater than the first TA threshold and less than or equal to the second TA threshold, the SMTC parameter 2 may be determined as the SMTC parameter. When the TA between the terminal device and the NTN is greater than the second TA threshold, the SMTC parameter 1 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The first TA threshold may be less than the second TA threshold.

In a manner 4, the terminal device may select the SMTC parameter from the at least two SMTC parameters based on the TA between the terminal device and the TN.

The terminal device may obtain the TA between the terminal device and the TN at first, and subsequently, select the SMTC parameter from the at least two SMTC parameters based on the TA between the terminal device and the TN. The terminal device may obtain the TA between the terminal device and the TN from the first information.

In some embodiments, a corresponding relationship between the SMTC period and the TA or a corresponding relationship between the SMTC gap (time between two SMTCs) and the TA may be set in advance. The SMTC period or the SMTC gap may be positively correlated with the TA. That is, the smaller the TA, the smaller the SMTC period or the smaller the SMTC gap; and the greater the TA, the greater the SMTC period or the greater the SMTC gap. Accordingly, the terminal device may determine the SMTC parameter from the at least two SMTC parameters based on the TA between the terminal device and the TN and the corresponding relationship.

In some embodiments, when the plurality of measurement parameters include two SMTC parameters, a TA threshold may be obtained from the activation condition. When the TA between the terminal device and the TN is greater than or equal to the TA threshold, a greater one of the two SMTC parameters (the SMTC period and the SMTC gap) may be determined as the SMTC parameter. When the TA between the terminal device and the TN is less than the TA threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a first TA threshold and a second TA threshold may be obtained from the activation condition. When the TA between the terminal device and the TN is less than or equal to the first TA threshold, the SMTC parameter 1 may be determined as the SMTC parameter. When the TA between the terminal device and the TN is greater than the first TA threshold and less than or equal to the second TA threshold, the SMTC parameter 2 may be determined as the SMTC parameter. When the TA between the terminal device and the TN is greater than the second TA threshold, the SMTC parameter 3 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The first TA threshold may be less than the second TA threshold.

In a manner 5, the terminal device may select the SMTC parameter from the at least two SMTC parameters based on a link loss between the terminal device and the TN.

The terminal device may obtain the link loss between the terminal device and the TN at first, and subsequently, select the SMTC parameter from the at least two SMTC parameters based on the link loss between the terminal device and the TN. The terminal device may obtain the link loss between the terminal device and the TN from the first information. Alternatively, terminal device may obtain the link loss between the terminal device and the TN based on locating information and the like.

In some embodiments, a corresponding relationship between the SMTC period and the link loss or a corresponding relationship between the SMTC gap (time between two SMTCs) and the link loss may be set in advance. The SMTC period or the SMTC gap may be positively correlated with the link loss. That is, the smaller the link loss, the smaller the SMTC period or the smaller the SMTC gap; and the greater the link loss, the greater the SMTC period or the greater the SMTC gap. Accordingly, the terminal device may determine the SMTC parameter from the at least two SMTC parameters based on the link loss between the terminal device and the TN and the corresponding relationship.

In some embodiments, when the plurality of measurement parameters include two SMTC parameters, a link loss threshold may be obtained from the activation condition. When the link loss between the terminal device and the TN is greater than or equal to the link loss threshold, a greater one of the two SMTC parameters (the SMTC period and the SMTC gap) may be determined as the SMTC parameter. When the link loss between the terminal device and the TN is less than the link loss threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a first link loss threshold and a second link loss threshold may be obtained from the activation condition. When the link loss between the terminal device and the TN is less than or equal to the first link loss threshold, the SMTC parameter 1 may be determined as the SMTC parameter. When the link loss between the terminal device and the TN is greater than the first link loss threshold and less than or equal to the second link loss threshold, the SMTC parameter 2 may be determined as the SMTC parameter. When the link loss between the terminal device and the TN is greater than the second link loss threshold, the SMTC parameter 3 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The first link loss threshold may be less than the second link loss threshold.

In a manner 6, the terminal device may select the SMTC parameter from the at least two SMTC parameters based on a measured value of a reference signal, such as RSRP, between the terminal device and the TN.

The terminal device may obtain the measured value of the reference signal, such as RSRP, between the terminal device and the TN at first, and subsequently, select the SMTC parameter from the at least two SMTC parameters based on the measured value of the reference signal, such as RSRP, between the terminal device and the TN. The terminal device may obtain the measured value of the reference signal, such as RSRP, between the terminal device and the TN from the first information.

In some embodiments, a corresponding relationship between the SMTC period and the measured value of the reference signal, such as RSRP, or a corresponding relationship between the SMTC gap (time between two SMTCs) and the measured value of the reference signal, such as RSRP, may be set in advance. The SMTC period or the SMTC gap may be negatively correlated with the measured value of the reference signal, such as RSRP. That is, the greater the RSRP, the smaller the SMTC period or the smaller the SMTC gap; and the smaller the RSRP, the greater the SMTC period or the greater the SMTC gap. Accordingly, the terminal device may determine the SMTC parameter from the at least two SMTC parameters based on the measured value of the reference signal, such as RSRP, between the terminal device and the TN and the corresponding relationship.

In some embodiments, when the plurality of measurement parameters include two SMTC parameters, a RSRP threshold may be obtained from the activation condition. When the RSRP between the terminal device and the TN is less than or equal to the RSRP threshold, a greater one of the two SMTC parameters (the SMTC period and the SMTC gap) may be determined as the SMTC parameter. When the RSRP between the terminal device and the TN is greater than the RSRP threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a first RSRP threshold and a second RSRP threshold may be obtained from the activation condition. When the RSRP between the terminal device and the TN is less than or equal to the first RSRP threshold, the SMTC parameter 3 may be determined as the SMTC parameter. When the RSRP between the terminal device and the TN is greater than the first RSRP threshold and less than or equal to the second RSRP threshold, the SMTC parameter 2 may be determined as the SMTC parameter. When the RSRP between the terminal device and the TN is greater than the second RSRP threshold, the SMTC parameter 1 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The first RSRP threshold may be less than the second RSRP threshold.

In a manner 7, the terminal device may select the SMTC parameter from the at least two SMTC parameters based on the RTT between the terminal device and the NTN.

The terminal device may obtain the RTT between the terminal device and the NTN at first, and subsequently, select the SMTC parameter from the at least two SMTC parameters based on the RTT between the terminal device and the NTN. The terminal device may obtain the RTT between the terminal device and the NTN from the first information.

In some embodiments, a corresponding relationship between the SMTC period and the RTT or a corresponding relationship between the SMTC gap (time between two SMTCs) and the RTT may be set in advance. The SMTC period or the SMTC gap may be negatively correlated with the RTT. That is, the smaller the RTT, the greater the SMTC period or the greater the SMTC gap; and the greater the RTT, the smaller the SMTC period or the smaller the SMTC gap. Accordingly, the terminal device may determine the SMTC parameter from the at least two SMTC parameters based on the RTT between the terminal device and the NTN and the corresponding relationship.

In some embodiments, when the plurality of measurement parameters include two SMTC parameters, an RTT threshold may be obtained from the activation condition. When the RTT between the terminal device and the NTN is less than or equal to the RTT threshold, a greater one of the two SMTC parameters (the SMTC period and the SMTC gap) may be determined as the SMTC parameter. When the RTT between the terminal device and the NTN is greater than the RTT threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), a first RTT threshold and a second RTT threshold may be obtained from the activation condition. When the RTT between the terminal device and the NTN is less than or equal to the first RTT threshold, the SMTC parameter 3 may be determined as the SMTC parameter. When the RTT between the terminal device and the NTN is greater than the first RTT threshold and less than or equal to the second RTT threshold, the SMTC parameter 2 may be determined as the SMTC parameter. When the RTT between the terminal device and the NTN is greater than the second RTT threshold, the SMTC parameter 1 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The first RTT threshold may be less than the second RTT threshold.

In a manner 8, the terminal device may select the SMTC parameter from the at least two SMTC parameters based on the distance between the terminal device and the ground reference point.

In this manner, the cell that the terminal device is located may be the GEO cell. The ground reference point may be the ground reference point that is directly below the GEO.

The terminal device may obtain the distance between the terminal device and the ground reference point at first, and subsequently, select the SMTC parameter from the at least two SMTC parameters based on the distance between the terminal device and the ground reference point. The terminal device may obtain the distance between the terminal device and the ground reference point from the first information. Alternatively, the terminal device may obtain the distance between the terminal device and the ground reference point based on locating information.

In some embodiments, a corresponding relationship between the SMTC period and the distance between the terminal device and the ground reference point or a corresponding relationship between the SMTC gap (time between two SMTCs) and the distance between the terminal device and the ground reference point may be set in advance. The SMTC period or the SMTC gap may be negatively correlated with the distance. That is, the smaller the distance, the greater the SMTC period or the greater the SMTC gap; and the greater the distance, the smaller the SMTC period or the smaller the SMTC gap. Accordingly, the terminal device may determine the SMTC parameter from the at least two SMTC parameters based on the distance between the terminal device and the ground reference point and the corresponding relationship.

In some embodiments, when the plurality of measurement parameters include two SMTC parameters, a seventh distance threshold may be obtained from the activation condition. When the distance between the terminal device and the ground reference point is less than or equal to the seventh distance threshold, a greater one of the two SMTC parameters (the SMTC period and the SMTC gap) may be determined as the SMTC parameter. When the distance between the terminal device and the ground reference point is greater than the seventh distance threshold, a smaller one of the two SMTC parameters (the SMTC period and the SMTC gap) may be determined as the SMTC parameter.

In some embodiments, when the plurality of measurement parameters include three SMTC parameters (recorded as an SMTC parameter 1, an SMTC parameter 2 and an SMTC parameter 3), an eight distance threshold and a ninth distance threshold may be obtained from the activation condition. When the distance between the terminal device and the ground reference point is less than or equal to the eighth distance threshold, the SMTC parameter 3 may be determined as the SMTC parameter. When the distance between the terminal device and the ground reference point is greater than the eighth distance threshold and less than or equal to the ninth distance threshold, the SMTC parameter 2 may be determined as the SMTC parameter. When the distance between the terminal device and the ground reference point is greater than the ninth distance threshold, the SMTC parameter 1 may be determined as the SMTC parameter. A period or a gap of the SMTC parameter 3 may be greater than a period or a gap of the SMTC parameter 2. The period or the gap of the SMTC parameter 2 is greater than a period or a gap of the SMTC parameter 1. The eighth distance threshold may be less than the ninth distance threshold.

Figure 6:
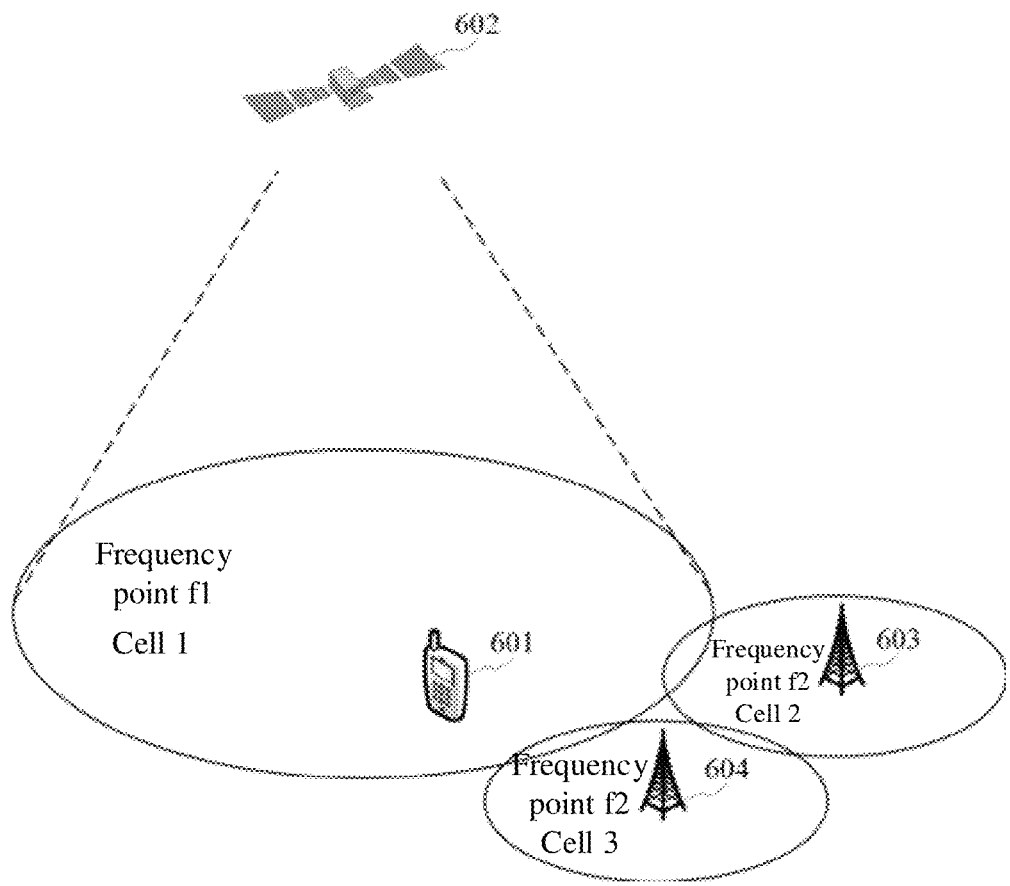
FIG. 6 is a schematic view of a scenario of measurement according to an embodiment of the present disclosure.

The above measurement method will be illustrated in detail by describing specific examples based on any one of the above embodiments, referring to FIG. 6.

FIG. 6 is a schematic view of a scenario of measurement according to an embodiment of the present disclosure. As shown in FIG. 6, in the scenario, a terminal device 601, a satellite 602, a base station 603 and a base station 604 are included.

A cell served by the satellite 602 may be referred to as a cell 1, corresponding to a frequency point f1. A cell served by the base station 603 may be referred to as a cell 2, corresponding to a frequency point f2. A cell served by the base station 604 may be referred to as a cell 3, corresponding to a frequency point f2.

When the satellite 602 functions as a base station, the satellite 602 may send to the terminal device 601 at least two configuration parameters. The at least two configuration parameters may include: an SMTC parameter 1, an SMTC parameter 2, a measurement gap parameter 1 and a measurement gap parameter 2. The satellite 602 may further send to the terminal device 601 the frequency point f2, an identifier of the cell 2, an identifier of the cell 3, indication information indicating that the cell 2 and the cell 3 are TN cells, such that the satellite 602 may instruct the terminal device 601 to perform measurement on the cell 2 and the cell 3.

When the satellite 602 further sends a TA threshold (activation condition) to the terminal device 601 to enable the terminal device 601 to select the SMTC parameter and the measurement detection parameter based on the TA threshold and a TA between the terminal device 601 and the satellite.

For the cell 1 and the cell 2, when the terminal device 601 selects the SMTC parameter 1 and measurement gap parameter 1, the terminal device 601 may perform measurement on the cell 1 and the cell 2 based on the SMTC parameter 1 and the measurement gap parameter 1.

In the above process, the satellite may configure two SMTC parameters and two measurement gap parameters for the terminal device, such that the terminal device may select one SMTC parameter from the two SMTC parameters and one measurement gap parameter from the two measurement interval parameters based on the TA between the terminal device and the satellite, and may perform measurement on the TN cell based on the selected SMTC parameter and the selected measurement gap parameter. In this way, a situation that the terminal device is unable to discover the TN cell in time or performs measurements frequently, may be prevented, and communication performance between the terminal device and the network device may be improved.

Figure 7:
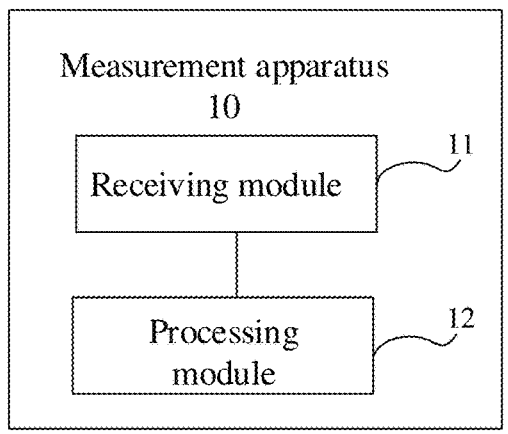
FIG. 7 is a structural schematic view of a measurement apparatus according to an embodiment of the present disclosure.

FIG. 7 is a structural schematic view of a measurement apparatus according to an embodiment of the present disclosure. The measurement apparatus 10 may be the terminal device or may be configured inside the terminal device. As shown in FIG. 7, the measurement apparatus 10 may include a receiving module 11 and a processing module 12.

The receiving module 11 may be configured to obtain a plurality of measurement parameters of the network device.

The processing module 12 may be configured to determine the first measurement parameter from the plurality of measurement parameters and perform measurement on the TN cell based on the first measurement parameter.

The measurement apparatus provided by the present disclosure may perform the technical solution shown in the method embodiments above. An implementation principle and beneficial effects of the present embodiment may be similar to those of the above embodiments, and will not be repeated here.

In an embodiment, the plurality of measurement parameters may include at least two synchronous block measurement timing configuration SMTC parameters and/or at least two measurement gap parameters.

In an embodiment, the SMTC parameter may be configured to indicate the time point of receiving the SSB.

In an embodiment, the SMTC parameter may include at least one of following information:
the period of the SMTC;
the time length of the SMTC;
the starting time of the SMTC within one period;
the ending time of the SMTC within one period.

In an embodiment, the measurement gap parameter may be configured to indicate the measurement time for the TN cell.

In an embodiment, the measurement gap parameter may include at least one of the following information:
the period of the measurement gap;
the time length of the measurement gap;
the starting time of the measurement gap within one period;
the ending time of the measurement gap within one period.

In an embodiment, the first measurement parameter may include the SMTC parameter and/or the measurement gap parameter.

In an embodiment, the first measurement parameter may include a SMTC parameter when the TN cell corresponds to a same frequency point; or
the first measurement parameter may include the SMTC parameter and the measurement gap parameter when the TN cell correspond to different frequency points or frequency points of different systems; or
the first measurement parameter may include the measurement gap parameter when taking the first signal for performing the measurement, and the first signal may be a signal other than SSB.

In an embodiment, the receiving module 11 may be specifically configured to:
receive the first message sent by the network device, the first message including the plurality of measurement parameters.

In an embodiment, the first message may further include at least one of the following information:
the identifier of the TN cell; and
the frequency point corresponding to the TN cell;
the second indication information, configured to indicate the type of the TN cell;
the measurement frequency point;
the identifier of the cell corresponding to the measurement frequency point;
the identifier of the TN cell corresponding to the measurement frequency point;
first indication information, configured to indicate the type of the cell corresponding to the measurement frequency point; and
first configuration information, configured to indicate the activation condition of the measurement parameter.

In an embodiment, the TN cell corresponding to the measurement frequency point may include the TN cell.

In an embodiment, the first message may be the radio resource control RRC message or the system message.

In an embodiment, the processing module 12 may specifically be configured to:
determine the first measurement parameter from the plurality of measurement parameters based on the first information and/or the first configuration information, the first configuration information being configured to indicate the activation conditions for the measurement parameter.

In an embodiment, the first information may include at least one of the following:
the location of the terminal device;
the deployment information of the non-terrestrial communication network NTN;
the moving track of the terminal device;
the astronomical calendar of the NTN;
deployment or location information of the TN;
the distance between the terminal device and the network device;
the distance between the terminal device and the ground reference point;
the round-trip transmission time RTT between the terminal device and the network device;
the timing advance TA between the terminal device and the network device;
the link loss between the terminal device and the terminal device;
the RSRP between the terminal device and the network device.

In an embodiment, the terminal device is the terminal device in the NTN.

In an embodiment, the processing module 12 may specifically be configured to:
determine the first measurement parameter from the plurality of measurement parameters when the terminal device determines that the cell in which the terminal device is currently located is the NTN cell.

In an embodiment, the processing module 12 may determine that the cell in which the terminal device is currently located is the NTN cell based on the second information, and the second information may include at least one of the following:
the PLMN information;
the frequency point information;
the third indication information configured to indicate the type of the cell;
configuration or indication of the measurement parameters;
the fourth indication information configured to indicate that the number of measurement parameters configured for the terminal device is one;

the fifth indication information configured to indicate that the number of measurement parameters configured for the terminal device is more than one; and the sixth indication information configured to indicate the type of the frequency point.

In an embodiment, the first measurement parameter may include the SMTC parameter.

The receiving module 11 may further be configured to receive the synchronous signal block SSB sent by the network device based on the SMTC parameter.

The processing module 12 may be configured to perform measurement on the TN cell based on the SSB.

In an embodiment, the first measurement parameter may include the SMTC parameter and the measurement gap parameter.

The receiving module 11 may further be configured to receive the synchronous signal block SSB sent by the network device based on the SMTC parameter.

The processing module 12 may be configured to determine a measurement time for the TN cell based on the measurement gap parameter and to perform measurement on the TN cell based on the SSB.

In an embodiment, the processing module 12 may further be configured to determine a receiving time point based on the SMTC parameter.

The receiving module may specifically be configured to receive the SSB sent by the network device at the receiving time point.

In an embodiment, the first measurement parameter may include the measurement gap parameter. The processing module 12 may specifically be configured to:

determine the measurement time for the TN cell based on the measurement gap parameter; and perform the measurement on the TN cell based on the first signal during the measurement time, the first signal being a signal other than the SSB.

The measurement apparatus provided by the present embodiment may perform the technical solution shown in the method embodiments above. An implementation principle and beneficial effects of the present embodiment may be similar to those of the above embodiments, and will not be repeated here.

Figure 8:
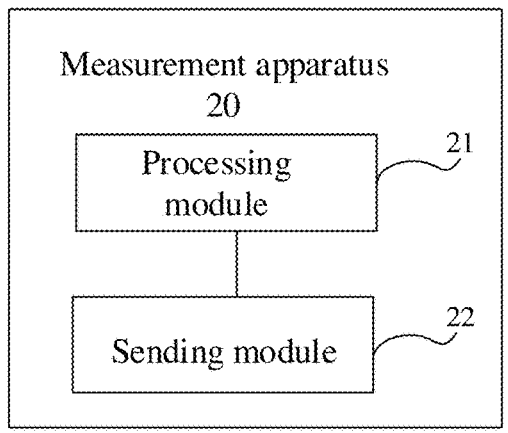
FIG. 8 is a structural schematic view of another measurement apparatus according to an embodiment of the present disclosure.

FIG. 8 is a structural schematic view of another measurement apparatus according to an embodiment of the present disclosure. The measurement apparatus 20 may be the network device or may be configured inside the network device. As shown in FIG. 8, the measurement apparatus 20 may include a processing module 21 and a sending module 22.

The processing module 21 may be configured to determine the plurality of measurement parameters.

The sending module 22 may be configured to send the plurality of measurement parameters to the terminal device, and the first measurement parameter of the plurality of measurement parameters may be used by the terminal device to perform measurement on the TN cell.

The measurement apparatus provided by the present embodiment may perform the technical solution shown in the method embodiments above. An implementation principle and beneficial effects of the present embodiment may be similar to those of the above embodiments, and will not be repeated here.

In an embodiment, the plurality of measurement parameters may include at least two synchronous block measurement timing configuration SMTC parameters and/or at least two measurement gap parameters.

In an embodiment, the SMTC parameter may be configured to indicate the time point of receiving the SSB.

In an embodiment, the SMTC parameter may include at least one of following information:

the period of the SMTC;
the time length of the SMTC;
the starting time of the SMTC within one period;
the ending time of the SMTC within one period.

In an embodiment, the measurement gap parameter may be configured to indicate the measurement time for the TN cell.

In an embodiment, the measurement gap parameter may include at least one of the following information:

the period of the measurement gap;
the time length of the measurement gap;
the starting time of the measurement gap within one period;
the ending time of the measurement gap within one period.

In an embodiment, the first measurement parameter may include the SMTC parameter and/or the measurement gap parameter.

In an embodiment, the first measurement parameter may include a SMTC parameter when the TN cell correspond to a same frequency point; or the first measurement parameter may include the SMTC parameter and the measurement gap parameter when the TN cell corresponds to different frequency points or frequency points of different systems; or the first measurement parameter may include the measurement gap parameter when the first signal being used for performing the measurement, and the first signal may be a signal other than SSB.

In an embodiment, the sending module 22 may be specifically configured to:

send the first message to the terminal device, the first message including the plurality of measurement parameters.

In an embodiment, the first message may further include at least one of the following information:

the identifier of the TN cell; and
the frequency point corresponding to the TN cell;
the second indication information, configured to indicate the type of the TN cell;
the measurement frequency point;
the identifier of the cell corresponding to the measurement frequency point;
the identifier of the TN cell corresponding to the measurement frequency point;
first indication information, configured to indicate the type of the cell corresponding to the measurement frequency point; and
first configuration information, configured to indicate the activation condition of the measurement parameter.

In an embodiment, the TN cell corresponding to the measurement frequency point may include the TN cell.

In an embodiment, the first message may be the radio resource control RRC message or the system message.

In an embodiment, the terminal device may be the terminal device in the non-terrestrial communication network NTN.

In an embodiment, the neighboring cell of the terminal device may include the TN cell.

The measurement apparatus provided by the present embodiment may perform the technical solution shown in the method embodiments above. An implementation principle and beneficial effects of the present embodiment may be similar to those of the above embodiments, and will not be repeated here.

Figure 9:
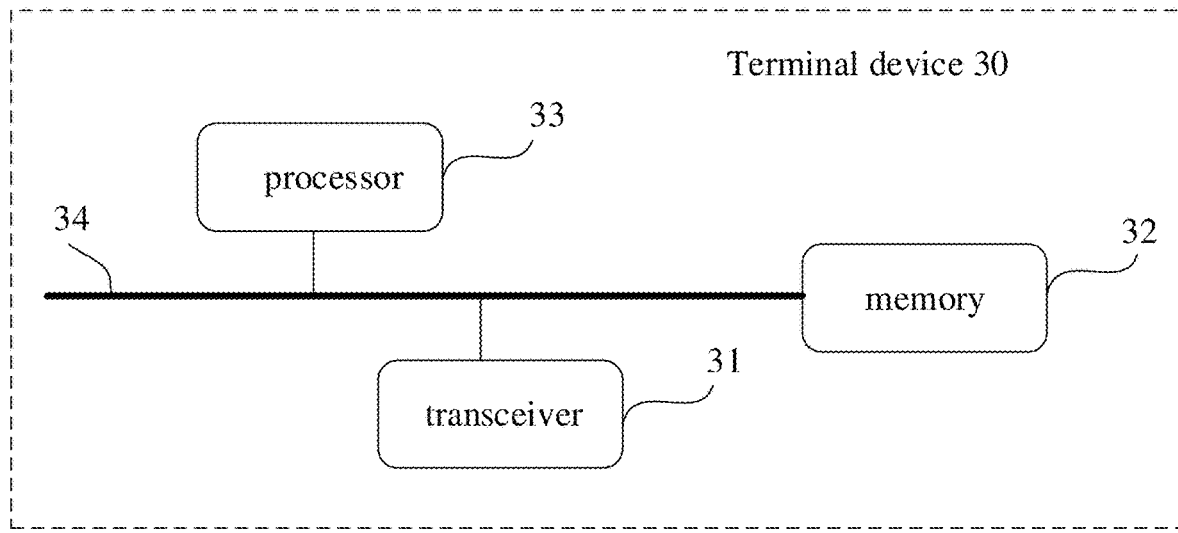
FIG. 9 is a structural schematic view of a terminal device according to an embodiment of the present disclosure.

FIG. 9 is a structural schematic view of a terminal device according to an embodiment of the present disclosure. As shown in FIG. 9, the terminal device 30 may include a transceiver 31, a memory 32, a processor 33. The transceiver 31 may include a transmitter and/or a receiver. The transmitter may also be referred to as an emitter, a sender, a transmitting port or a transmitting interface, and the like. The receiver may also be referred to as a receiver, a receiving machine, a receiving port or a receiving interface, and the like. Exemplarily, the transceiver 31, the memory 32, the processor 33 are interconnected with each other by a bus line 34.

The memory 32 may be configured to store program instructions.

The processor 33 may be configured to execute the program instructions stored in the memory to cause the terminal device 30 to perform the measurement method shown in any one of the above embodiments.

The receiver of the transceiver 31 may be configured to perform the receiving function of the terminal device in the measurement method described above.

Figure 10:
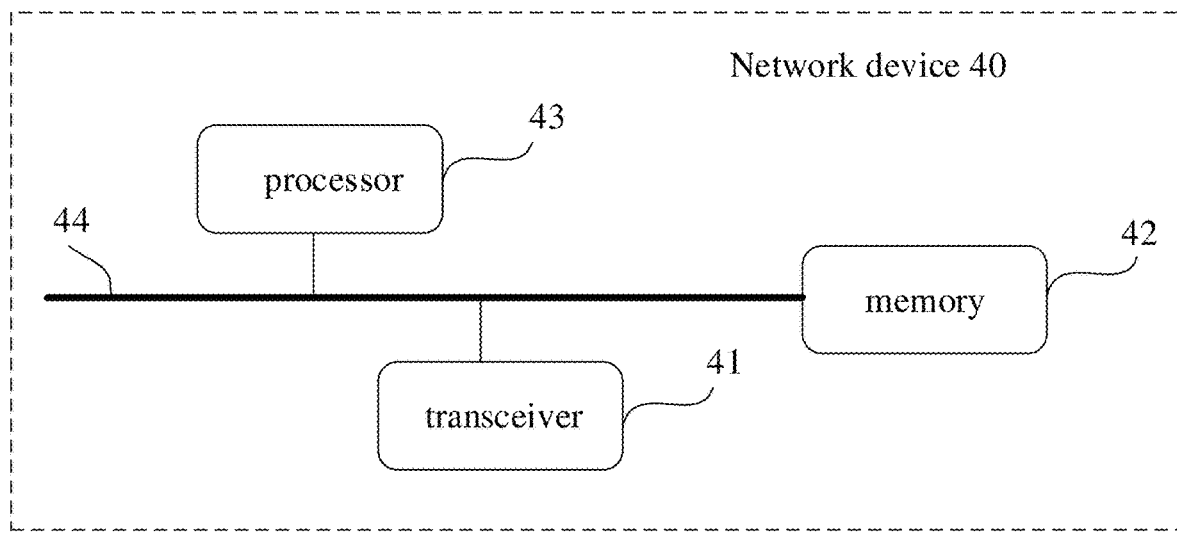
FIG. 10 is a structural schematic view of a network device according to an embodiment of the present disclosure.

FIG. 10 is a structural schematic view of a network device according to an embodiment of the present disclosure. As shown in FIG. 10, the network device 40 may include: a transceiver 41, a memory 42, and a processor 43. The transceiver 41 may include: a transmitter and/or a receiver. The transmitter may also be referred to as an emitter, a sender, a transmitting port or a transmitting interface, and the like. The receiver may also be referred to as a receiver, a receiving machine, a receiving port or a receiving interface, and the like. Exemplarily, the transceiver 41, the memory 42, the processor 43 are interconnected with each other by a bus line 44.

The memory 42 may be configured to store program instructions.

The processor 43 may be configured to execute the program instructions stored in the memory to cause the network device 40 to perform the measurement method shown in any one of the above embodiments.

The receiver of the transceiver 41 may be configured to perform the receiving function of the terminal device in the measurement method described above.

Embodiments of the present disclosure provide a computer-readable storage medium. The computer-readable storage medium may store computer-executable instructions. The computer-executable instructions may be configured to implement the above measurement methods when being executed by a processor.

Embodiments of the present disclosure provide a computer program product. The computer program product may be executed by a processor. The measurement methods performed by the terminal device as shown in any one of above embodiments may be achieved, when the computer program product is executed.

Embodiments of the present disclosure provide a computer program product. The computer program product may be executed by a processor. The measurement methods performed by the network device as shown in any one of above embodiments may be achieved, when the computer program product is executed.

The terminal device, the computer-readable storage medium and the computer program product of the embodiments of the present disclosure may perform the measurement method performed by the terminal device, detailed implementation processes and beneficial effects may refer to the above description and will not be repeated here.

The network device, the computer-readable storage medium and the computer program product of the embodiments of the present disclosure may perform the measurement method performed by the network device, detailed implementation processes and beneficial effects may refer to the above description and will not be repeated here.

All or some of the operations of the method embodiments as described above may be implemented may be achieved by hardware associated with program instructions. The above-mentioned program may be stored in a readable memory. The program may perform the operations of the method embodiments as described above when being executed. The above-mentioned memory (storage medium) may include: a read-only memory (ROM), a RAM, a flash memory, a hard disk, a solid state drive, a magnetic tape, a floppy disk, an optical disc and any combination thereof.

Embodiments of the present disclosure are described by referring to flow charts and/or block diagrams of methods, devices (systems), and computer program products of the present disclosure. It may be understood that each process and/or block in the flowchart and/or in the block diagram and combination of processes and/or blocks in the flowchart and/or in the block diagram may be implemented by computer program instructions. These computer program instructions may be provided to a general purpose computer, a dedicated computer, an embedded processor or a processing unit of any other programmable data processing device to produce a machine, such that the instructions executed by the processing unit of the computer or the programmable data processing device may produce a device for implementing the functions specified in one or more processes of the flowchart and/or one or more blocks of the block diagram.

These computer program instructions may also be stored in a computer readable memory that is capable of directing a computer or other programmable data processing device to operate in a particular manner, such that the instructions stored in the computer readable memory may produce an article including an instruction device. The instruction device implements the function specified in one or more processes of a flowchart and/or one or more blocks of a block diagram.

These computer program instructions may also be loaded onto a computer or other programmable data processing device, such that a series of operations are performed on the computer or other programmable device to produce computer-implemented processing. In this way, the instructions executed on the computer or other programmable device provide operations for implementing the functions specified in one or more processes of the flowchart and/or one or more blocks of the block diagram.

Apparently, any person skilled in the art may perform various modifications and variations on embodiments of the present disclosure without departing from the spirit and scope of the present disclosure. When these modifications and variations of the embodiments of the present disclosure fall within the scope of the claims and technical equivalents of the claims of the present disclosure, the present disclosure also covers these modifications and variations.

In the present disclosure, the term "including" and variations thereof may refer to non-limiting inclusion. The term "or" and variations thereof may refer to "and/or". The terms "first", "second", and so on are used to distinguish similar objects and are not used to describe a particular order or sequence. In the present disclosure, "plurality" means two or more. The term "and/or" may describe association of related objects and may indicate that three relationships may be present. For example, "A and/or B" may indicate: A alone; both A and B; and B alone. The character "/" may generally indicate an "or" relationship between the former object and latter object.

What is claimed is:

1. A measurement method, comprising:
obtaining, by a terminal device, a plurality of measurement parameters of a network device; and
determining, by the terminal device, a first measurement parameter from the plurality of measurement parameters and performing measurement on a terrestrial network (TN) cell based on the first measurement parameter;
wherein the plurality of measurement parameters comprise at least two synchronous block measurement timing configuration (SMTC) parameters and/or at least two measurement gap parameters; and
the first measurement parameter only comprises one SMTC parameter of the at least two SMTC parameters in response to the TN cell corresponding to a same frequency point as the terminal device.

2. The method according to claim 1, wherein the at least two SMTC parameters comprise at least one of:
a period of SMTC;
a time length of the SMTC;
a starting time of the SMTC within one period; and
an ending time of the SMTC within one period.

3. The method according to claim 1, wherein each of the at least two measurement gap parameters is configured to indicate a measurement time for the TN cell.

4. The method according to claim 1, wherein the at least two measurement gap parameters comprise at least one of:
a period of a measurement gap;
a time length of the measurement gap;
a starting time of the measurement gap within one period; and
an ending time of the measurement gap within one period.

5. The method according to claim 1, wherein,
the first measurement parameter comprises one SMTC parameter and one measurement gap parameter of the at least two measurement gap parameters in response to the TN cell corresponding to different frequency points; or
the first measurement parameter comprises one measurement gap parameter of the at least two measurement gap parameters in response to a first signal being used for performing the measurement, wherein the first signal is a signal other than a SSB.

6. The method according to claim 1, wherein the terminal device receiving the plurality of measurement parameters sent by the network device, comprises:
receiving, by the terminal device, a first message sent by the network device, wherein the first message comprises the plurality of measurement parameters.

7. The method according to claim 6, wherein the first message further comprises at least one of:
an identifier of the TN cell;
a frequency point corresponding to the TN cell;
second indication information, configured to indicate a type of the TN cell;
a measurement frequency point;
an identifier of a cell corresponding to the measurement frequency point;
an identifier of the TN cell corresponding to the measurement frequency point;
first indication information, configured to indicate a type of the cell corresponding to the measurement frequency point; and
first configuration information, configured to indicate an activation condition of each of the plurality of measurement parameters.

8. The method according to claim 1, wherein the determining the first measurement parameter from the plurality of measurement parameters, comprises:
determining, by the terminal device, the first measurement parameter from the plurality of measurement parameters based on the first message and/or first configuration information, wherein the first configuration information is configured to indicate an activation condition of each of the plurality of measurement parameters.

9. The method according to claim 8, wherein the first message comprises at least one of:
a location of the terminal device;
deployment information of a non-terrestrial communication network (NTN);
a moving track of the terminal device;
an astronomical calendar of the NTN;
deployment or location information of a TN;
a distance between the terminal device and the network device;
a distance between the terminal device and a ground reference point;
a round-trip transmission time (RTT) between the terminal device and the network device;
a timing advance (TA) between the terminal device and the network device;
a link loss between the terminal device and the network device; and
a reference signal received power (RSRP) between the terminal device and the network device.

10. The method according to claim 1, wherein the terminal device is a terminal device in a non-terrestrial communication network (NTN).

11. The method according to claim 1, wherein the determining the first measurement parameter from the plurality of measurement parameters, comprises:
determining, by the terminal device, the first measurement parameter from the plurality of measurement parameters in response to the terminal device determining that the cell in which the terminal device is currently located is an NTN cell.

12. The method according to claim 11, wherein the terminal device determines that the cell in which the terminal device is currently located is the NTN cell based on second information, and the second information comprises at least one of:
public land mobile network (PLMN) information;
frequency point information;
third indication information, configured to indicate the type of the cell;
configuration or indication of the measurement parameters;
fourth indication information, configured to indicate that the number of measurement parameters configured for the terminal device is one;
fifth indication information, configured to indicate that the number of measurement parameters configured for the terminal device is more than one; and
sixth indication information configured to indicate a type of a frequency point.

13. The method according to claim 1, wherein the first measurement parameter comprises the one SMTC parameter; and
- the performing measurement on the TN cell based on the first measurement parameter, comprises:
- receiving, by the terminal device, a SSB sent by the network device based on the SMTC parameter; and
- performing, by the terminal device, measurement on the TN cell based on the SSB.

14. The method according to claim 1, wherein the first measurement parameter comprises the one SMTC parameter and one measurement gap parameter of the at least two measurement gap parameters; and
- the performing measurement on the TN cell based on the first measurement parameter, comprises:
- receiving, by the terminal device, a SSB sent by the network device based on the SMTC parameter;
- determining, by the terminal device, a measurement time for the TN cell based on the measurement gap parameter; and
- performing, by the terminal device, measurement on the TN cell based on the SSB during the measurement time.

15. The method according to claim 13, wherein the receiving a SSB sent by the network device based on the SMTC parameter, comprises:
- determining, by the terminal device, a receiving time point based on the SMTC parameter; and
- receiving, by the terminal device, the SSB sent by the network device at the receiving time point.

16. The method according to claim 1, wherein the first measurement parameter comprises the measurement gap parameter; and
- the performing measurement on the TN cell based on the first measurement parameter, comprises:
- determining, by the terminal device, a measurement time for the TN cell based on the measurement gap parameter; and
- performing, by the terminal device, measurement on the TN cell based on a first signal during the measurement time, wherein the first signal is a signal other than the SSB.

17. A measurement method, comprising:
- determining, by a network device, a plurality of measurement parameters; and
- sending, by the network device, the plurality of measurement parameters to a terminal device, wherein
- a first measurement parameter of the plurality of measurement parameters is used by the terminal device to perform measurement on a terrestrial network (TN) cell;
- wherein the plurality of measurement parameters comprise at least two synchronous block measurement timing configuration (SMTC) parameters and/or at least two measurement gap parameters; and
- the first measurement parameter only comprises one SMTC parameter of the at least two SMTC parameters in response to the TN cell corresponding to a same frequency point as the terminal device.

18. A terminal device, comprising a transceiver, a processor and a memory, wherein,
- the memory is configured to store computer-executable instructions; and
- the processor is configured to execute the computer-executable instructions stored in the memory to enable the processor to perform operations of:
- obtaining, by a terminal device, a plurality of measurement parameters of a network device; and
- determining, by the terminal device, a first measurement parameter from the plurality of measurement parameters and performing measurement on a terrestrial network (TN) cell based on the first measurement parameter;
- wherein the plurality of measurement parameters comprise at least two synchronous block measurement timing configuration (SMTC) parameters and/or at least two measurement gap parameters; and
- the first measurement parameter only comprises one SMTC parameter of the at least two SMTC parameters in response to the TN cell corresponding to a same frequency point as the terminal device.

* * * * *